US005467854A

United States Patent [19]
Creger et al.

[11] Patent Number: 5,467,854
[45] Date of Patent: Nov. 21, 1995

[54] METHOD OF CONTROLLING CLUTCH-TO-CLUTCH SHIFTS FOR A POWERSHIFT TRANSMISSION

[75] Inventors: Todd D. Creger, Metamora; Randall M. Mitchell, Washington; Alan L. Stahl, Peoria, all of Ill.; James R. Talbott, Fitchburg, Mass.

[73] Assignee: Caterpillar Inc., Peoria, Ill.

[21] Appl. No.: 257,391

[22] Filed: Jun. 7, 1994

[51] Int. Cl.⁶ .................... F16D 25/10; F16D 48/06
[52] U.S. Cl. .................... 192/87.18; 475/128; 477/154; 477/155
[58] Field of Search .................... 192/87.18, 87.13; 475/128, 123; 477/143, 155, 154

[56] References Cited

U.S. PATENT DOCUMENTS

| | | | |
|---|---|---|---|
| 3,618,424 | 11/1971 | Golan et al. | 192/109 F X |
| 3,754,482 | 8/1973 | Sanders et al. | 475/132 X |
| 3,762,518 | 10/1973 | Hilpert | 192/3.57 X |
| 3,882,738 | 5/1975 | Audiffred et al. | 192/87.13 X |
| 3,956,947 | 5/1976 | Leising et al. | |
| 4,208,929 | 6/1980 | Heino et al. | |
| 4,414,863 | 11/1983 | Heino. | |
| 4,419,909 | 12/1983 | Opperud et al. | |
| 4,653,350 | 3/1987 | Downs et al. | |
| 4,707,789 | 11/1987 | Downs et al. | |
| 4,724,939 | 2/1988 | Lockhart et al. | |
| 4,836,057 | 6/1989 | Asayama et al. | |
| 4,838,124 | 6/1989 | Hamano et al. | |
| 4,841,815 | 6/1989 | Takahashi. | |
| 4,843,902 | 7/1989 | Patton et al. | |
| 4,854,194 | 8/1989 | Kaneko et al. | |
| 4,855,913 | 8/1989 | Brekkestran et al. | |
| 4,875,391 | 10/1989 | Leising et al. | |
| 4,953,679 | 9/1990 | Okino. | |
| 4,955,256 | 9/1990 | Kashihara et al. | |
| 4,967,385 | 10/1990 | Brekkestran et al. | |
| 4,967,611 | 11/1990 | Sugano. | |

(List continued on next page.)

FOREIGN PATENT DOCUMENTS

| | | |
|---|---|---|
| 0357184A1 | 3/1990 | European Pat. Off. |
| 0196358B1 | 5/1990 | European Pat. Off. |
| 0435377A3 | 7/1991 | European Pat. Off. |
| 0435375A3 | 7/1991 | European Pat. Off. |
| 0372073B1 | 2/1994 | European Pat. Off. |
| 2212871A | 8/1989 | United Kingdom. |
| WO9102913 | 3/1991 | WIPO. |

OTHER PUBLICATIONS

Article from Off–Highway Engineering Magazine dated Apr. 1993 entitled "Transmission Control System for Bulldozers".

Article No. 820392 entitled "Electronic Control of Automobile Transmissions" by G. Pannier and A. Laport.

Article No. 820394 entitled "Microcomputer Controlled Automatic Transmission" by A. L. Miller.

(List continued on next page.)

Primary Examiner—Rodney H. Bonck
Attorney, Agent, or Firm—David M. Masterson

[57] ABSTRACT

In one aspect of the present invention, an electronic shift control for a powershift transmission is disclosed. The transmission includes a plurality of speed and direction changing clutches. A plurality of pressure control valves are individually connected to the clutches. A hydraulic pump delivers pressurized hydraulic oil to predetermined pressure control valves to meter hydraulic fluid in response to receiving a clutch command signal. The method produces a shift from a first transmission ratio to a second transmission ratio through disengagement of an off-going clutch associated with the first transmission ratio and engagement of an on-coming clutch associated the second transmission ratio. The method includes filing an on-coming speed clutch, releasing an off-going direction clutch in response to the on-coming speed clutch being filled, and thereafter, gradually increasing the on-coming speed clutch pressure to engage the speed clutch. Finally, the on-coming direction clutch pressure is gradually increased to engage the direction clutch in response to the on-coming speed clutch being engaged.

11 Claims, 17 Drawing Sheets

U.S. PATENT DOCUMENTS

| | | |
|---|---|---|
| 4,967,620 | 11/1990 | Shimanaka . |
| 4,968,999 | 11/1990 | Fodale et al. . |
| 4,969,098 | 11/1990 | Leising et al. . |
| 4,975,845 | 12/1990 | Mehta . |
| 4,981,053 | 1/1991 | Yamaguchi . |
| 4,982,620 | 1/1991 | Holbrook et al. . |
| 4,989,470 | 2/1991 | Bulgrien . |
| 4,991,455 | 2/1991 | Bulgrien . |
| 5,004,084 | 4/1991 | Mehr-Ayin et al. . |
| 5,005,441 | 4/1991 | Narita . |
| 5,005,444 | 4/1991 | Kimura et al. . |
| 5,005,680 | 4/1991 | Satoh et al. . |
| 5,007,308 | 4/1991 | Narita . |
| 5,014,573 | 5/1991 | Hunter et al. . |
| 5,014,575 | 5/1991 | Fujiwara et al. . |
| 5,016,175 | 5/1991 | Baltusis et al. . |
| 5,018,408 | 5/1991 | Bota et al. . |
| 5,029,086 | 7/1991 | Yoshimura . |
| 5,029,492 | 7/1991 | Kiuchi . |
| 5,029,494 | 7/1991 | Lentz et al. . |
| 5,033,328 | 7/1991 | Shimanaka . |
| 5,035,312 | 7/1991 | Asayama et al. . |
| 5,036,718 | 8/1991 | Bulgrien . |
| 5,036,730 | 8/1991 | Sakai et al. . |
| 5,038,286 | 8/1991 | Asayama et al. . |
| 5,038,636 | 8/1991 | Vukovich et al. . |
| 5,046,174 | 9/1991 | Lentz et al. . |
| 5,046,175 | 9/1991 | Lentz et al. . |
| 5,046,176 | 9/1991 | Lin . |
| 5,046,178 | 9/1991 | Hibner et al. . |
| 5,050,456 | 9/1991 | Fukuda . |
| 5,050,458 | 9/1991 | Vukovich et al. . |
| 5,052,246 | 10/1991 | Yamaguchi . |
| 5,053,960 | 10/1991 | Brekkestran et al. . |
| 5,054,599 | 10/1991 | Marcott . |
| 5,056,639 | 10/1991 | Petzold et al. . |
| 5,058,460 | 10/1991 | Hibner et al. . |
| 5,063,813 | 11/1991 | Lentz . |
| 5,063,814 | 11/1991 | Baba et al. . |
| 5,067,084 | 11/1991 | Kau . |
| 5,067,373 | 11/1991 | Kyohzuka et al. . |
| 5,067,374 | 11/1991 | Sakai et al. . |
| 5,069,084 | 12/1991 | Matsuno et al. . |
| 5,070,747 | 12/1991 | Lentz et al. . |
| 5,072,390 | 12/1991 | Lentz et al. . |
| 5,085,105 | 2/1992 | Wakahara et al. . |
| 5,101,943 | 4/1992 | Bulgrien . |
| 5,113,720 | 5/1992 | Asayama et al. . |
| 5,168,973 | 12/1992 | Asayama et al. . |
| 5,174,137 | 12/1992 | Kato et al. . |
| 5,190,130 | 3/1993 | Thomas et al. . |
| 5,209,141 | 5/1993 | Asayama et al. . |
| 5,211,079 | 5/1993 | Runde et al. . |
| 5,216,606 | 6/1993 | Lentz et al. . |
| 5,224,577 | 7/1993 | Falck et al. . |
| 5,234,087 | 8/1993 | Jürgens et al. ............................ 192/3.58 |

OTHER PUBLICATIONS

Article No. 830880 entitled "Development of NISSAN Microprocessor Controlled Four Speed Lockup Automatic Transmission" by I. Suga et al.

Article No. 840448 entitled "Electronic Control of a 4–Speed Automatic Transmission with Lock–Up Clutch" by M. Schwab.

Article No. 901154 entitled "Trends of Powertrain Control" by N. Narumi et al.

Article No. 901156 entitled "Electronically–Controlled Transmission Systems–Current Position and Future Developments" by M. Schwab.

Article No. 901157 entitled "Advanced Controls for Heavy Duty Transmission Applications" by J. Bender and K. Struthers.

Article No. 901160 entitled "Powertrain Electronics–Progress on the Use and Development of the Computer Aided Gearshift Systems" by Bader.

Komatsu Technical Guide entitled "K–Atomics–Komatsu–Advanced Transmission with Optimum Modulation Control".

SAE Article 890528 entitled "The Chrysler A–604 Ultradrive 4–Speed Automatic Transaxle" by B. Martin and T. Nogle.

SAE Article No. 861050 entitled "Electronically Controlled Mechanical Automatic Transmission for Heavy Duty Trucks and Buses" by S. Tanaka.

SAE Article No. 890529 entitled "The All–Adaptive Controls for the Chrysler Ultradrive Transaxle" by M. Leising et al.

SAE Article No. 890530 entitled "Nissan Electronically Controlled Four Speed Automatic Transmission" by M. Shinohara et al.

SAE Technical Paper No. 861170 entitled "Digital Electronic Controls for Detroit Diesel Allison Heavy Hauling Transmissions" by R. C. Boyer.

SAE Technical Paper No. 861212 entitled "The Design and Development of A Four Speed Powershift Transmission . . . " by J. E. Goodbar et al.

SAE Technical Paper No. 880480 entitled "Borg–Warner Australia Model 85 Automatic Transmission" by E. Wilfinger and J. Thompson.

SAE Technical Paper No. 892000 entitled "A Study on Electro–Hydraulic Control for Automatic Transmission" by K. Hasunaka et al.

SAE Technical Paper No. 900550 entitled "Toyota ECT–i a New Automatic Transmission with Intelligent . . . " by T. Kondo et al.

SAE Technical Paper No. 901557 entitled "A Transmission Control System for Construction Machinery" by K. Kusaka and Y. Ohkura.

SAE Technical Paper No. 901592 entitled "Adaptive Electronic Tractor Shift Control System" by L. Ross and D. Panoushek.

SAE Technical Paper No. 910082 entitled "An Engine & Transmission Control System with New 16–bit Single Chip . . . " by S. Kuroyanagi et al.

SAE Technical Paper No. 910410 entitled "SCVT–A State of the Art Electronically Controlled Continuously Variable . . . " by S. Hirano et al.

SAE Technical Paper No. 910639 entitled "Analysis of a New Automatic Transmission Control System for LEXUS LS400" by H. Taniguchi et al.

SAE Technical Paper No. 910750 entitled "Diesel Deposit Forming Tendencies–Microanalysis Methods" by J. Perez et al.

SAE Technical Paper No. 911831 entitled "User–Friendly Electronic Powershift Transmission Controls" by G. Bulgrien.

SAE Technical Paper No. 911880 entitled "New Kubota Midsize Farm Tractor" by E. Shinohara et al.

SAE Technical Paper No. 911938 entitled "Improving Automatic Transmission Shift Quality by Feedback Control . . . " by Y. Narita.

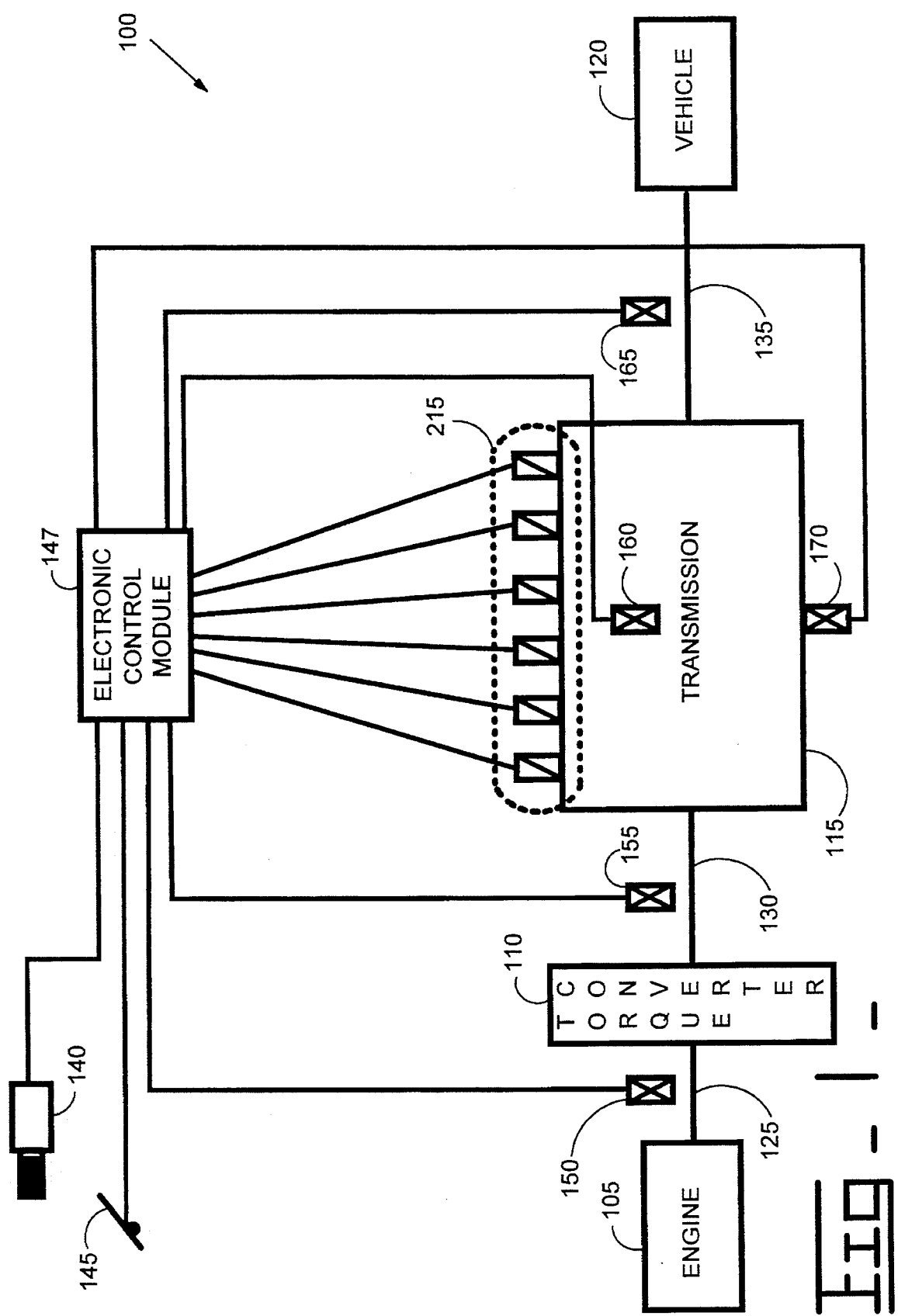

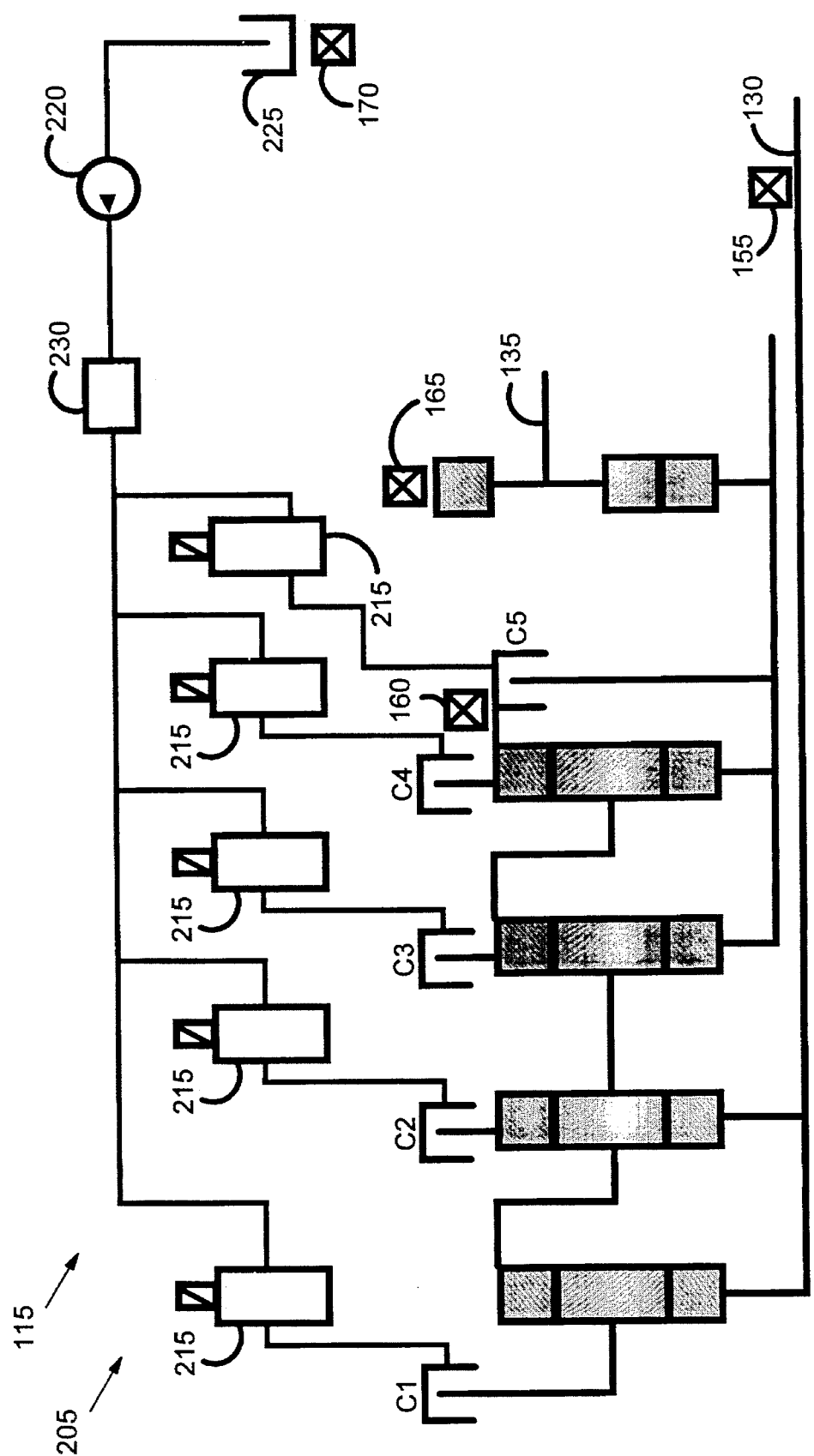
FIG-2A-

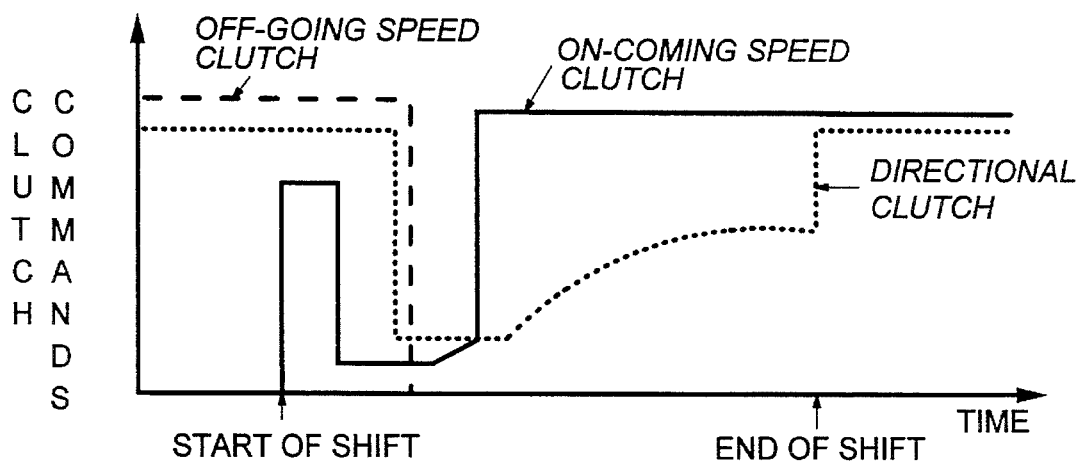
Fig_3_
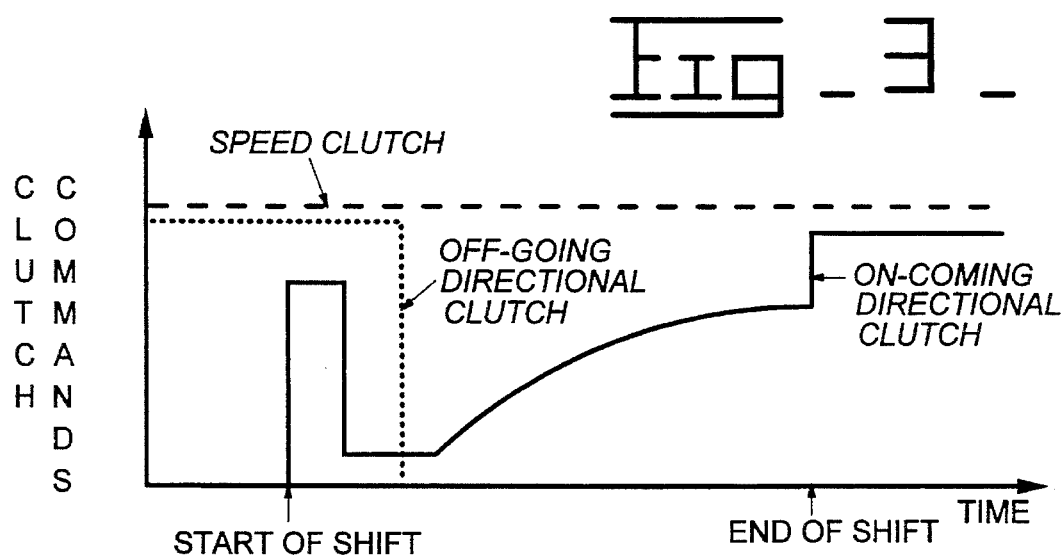
Fig_4_
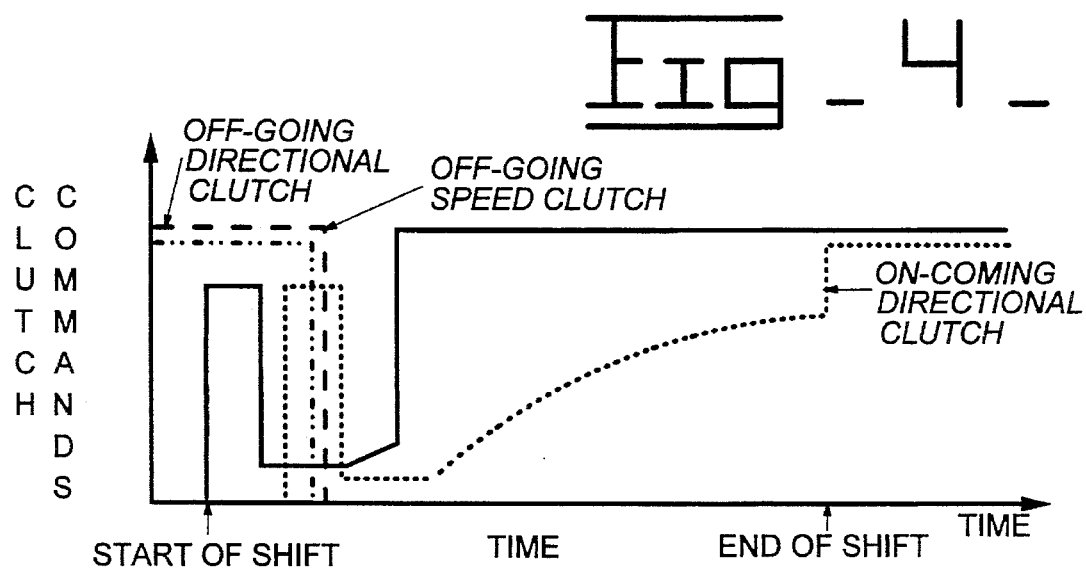
Fig_5_

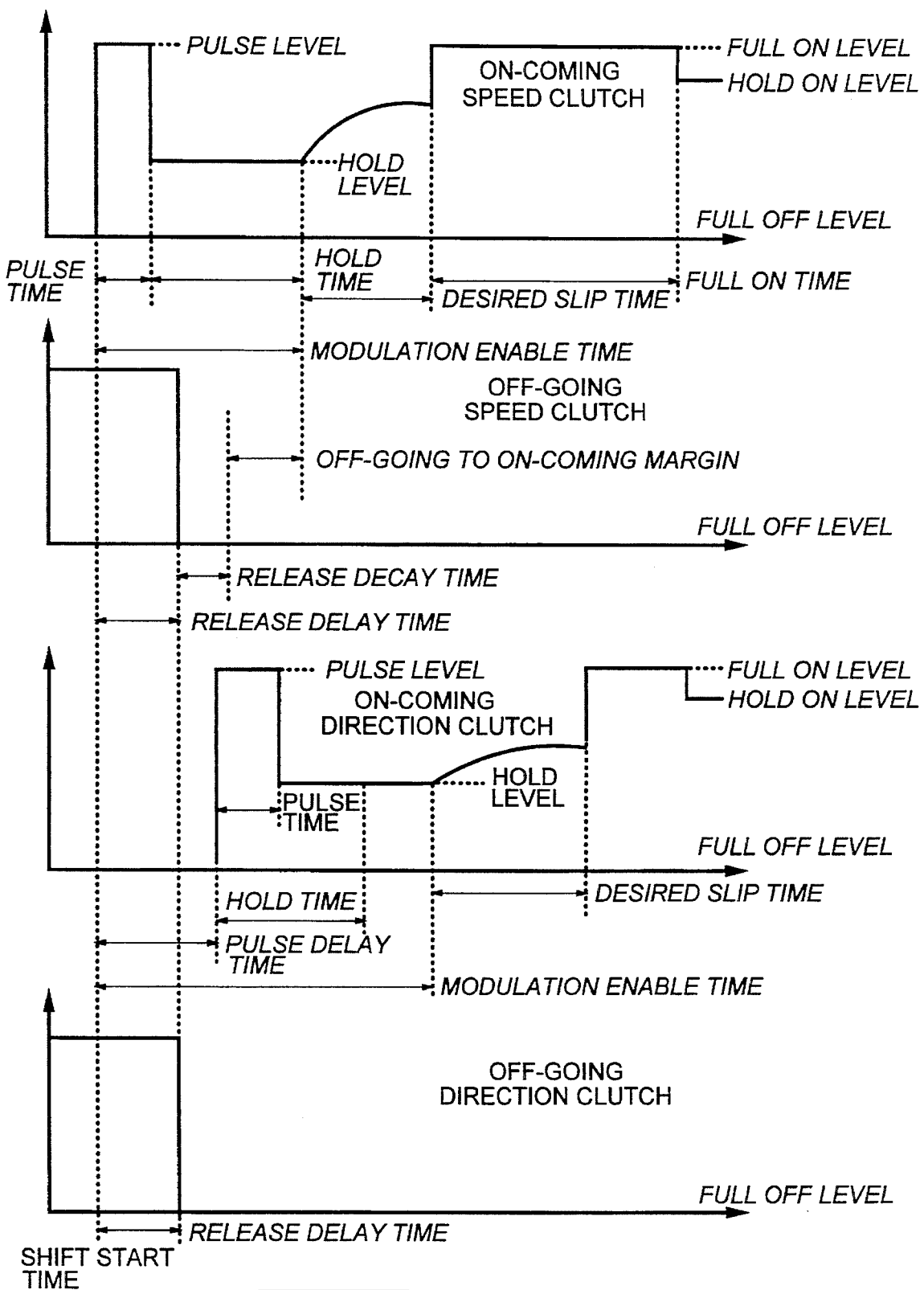
Fig_b_

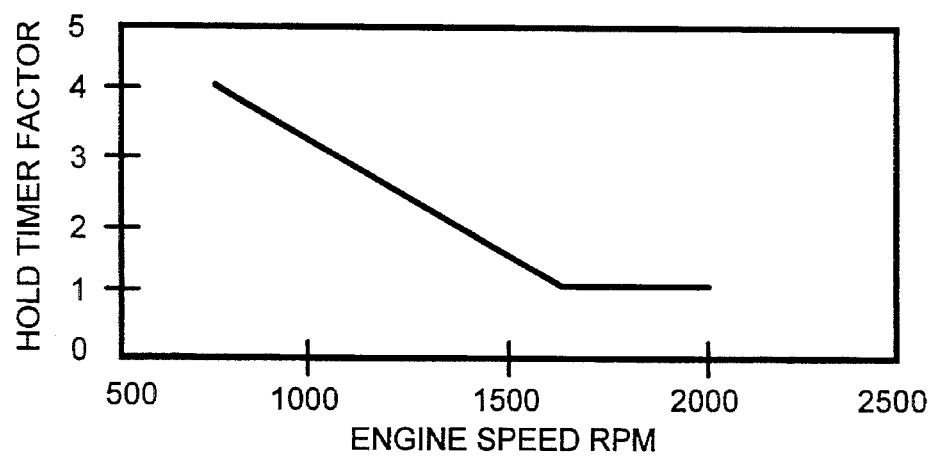
Fig-7A-
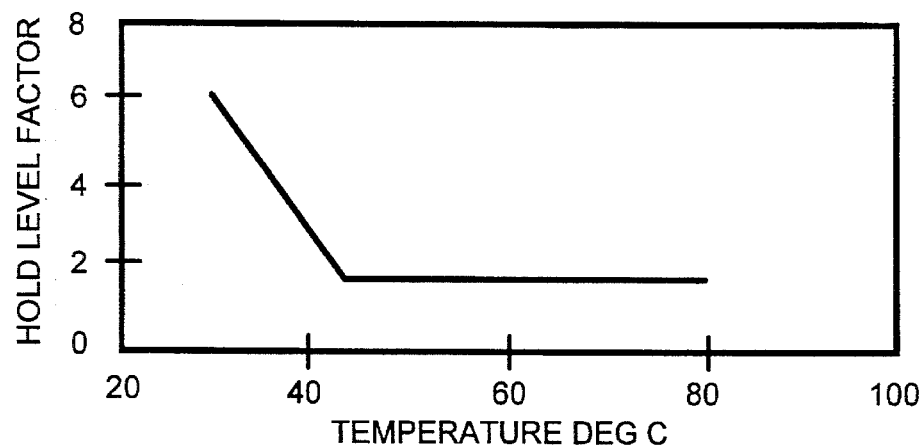
Fig-7B-
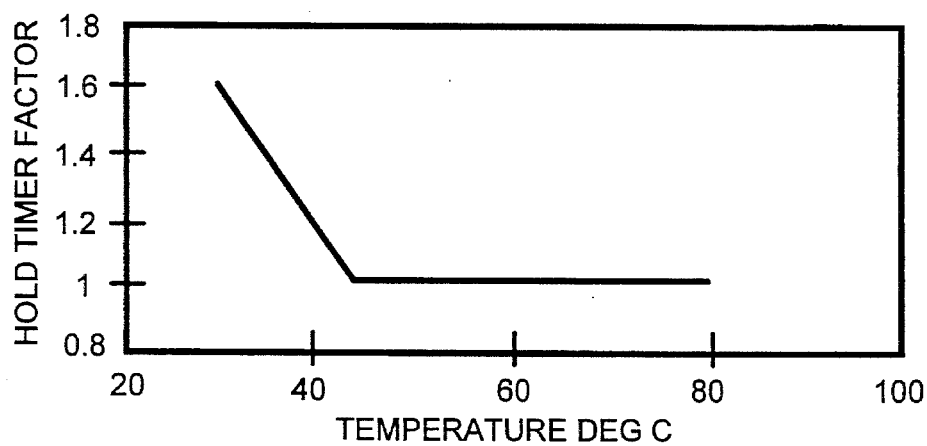
Fig-7C-

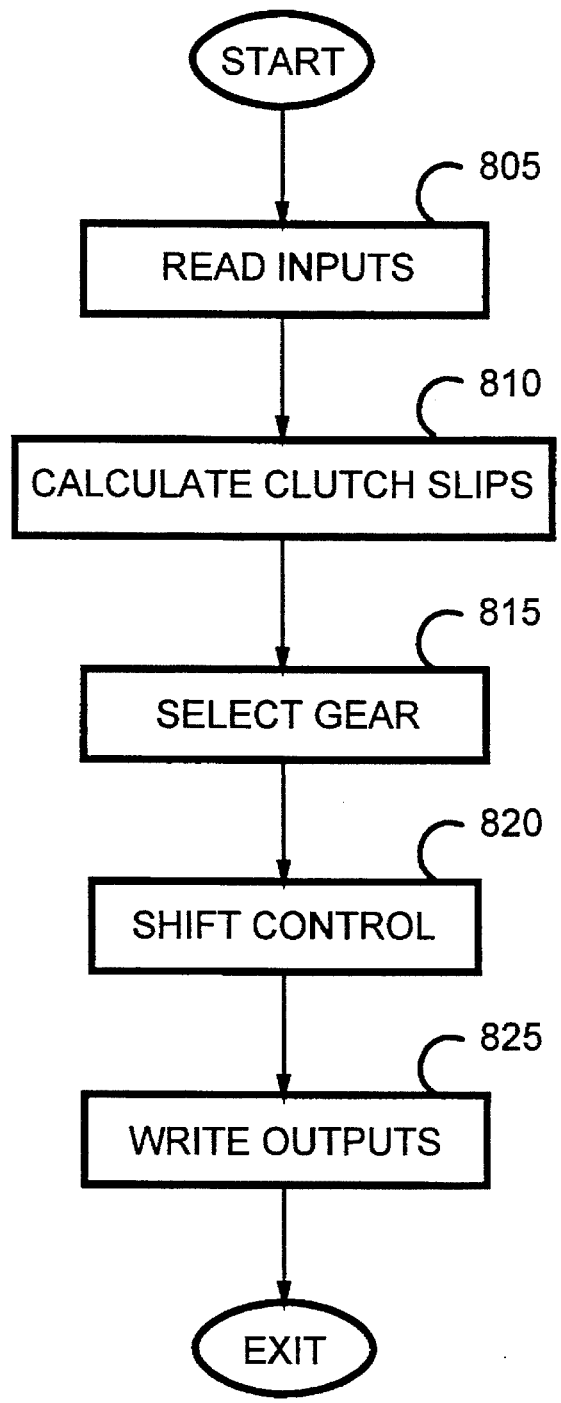

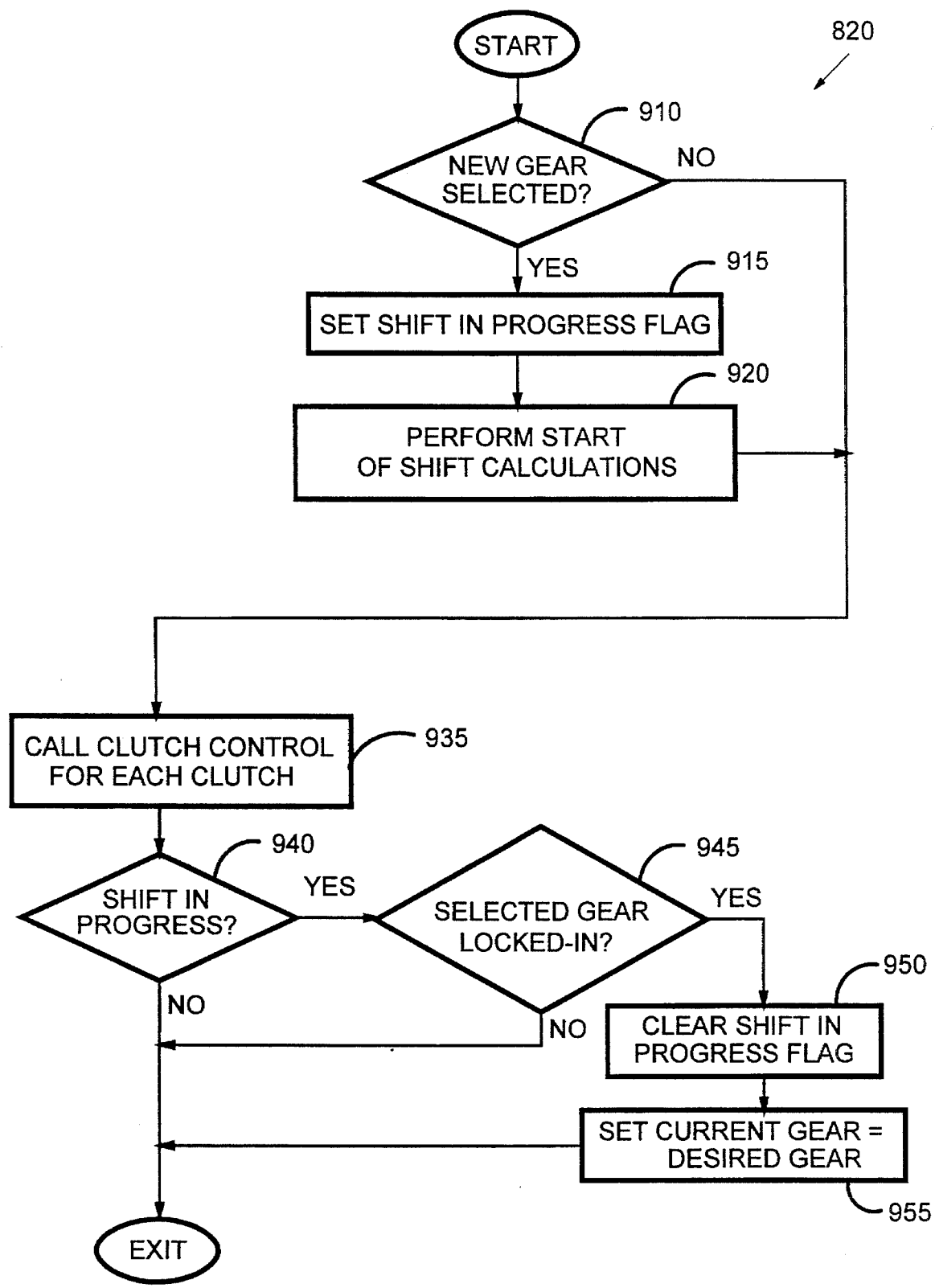
Fig_9_

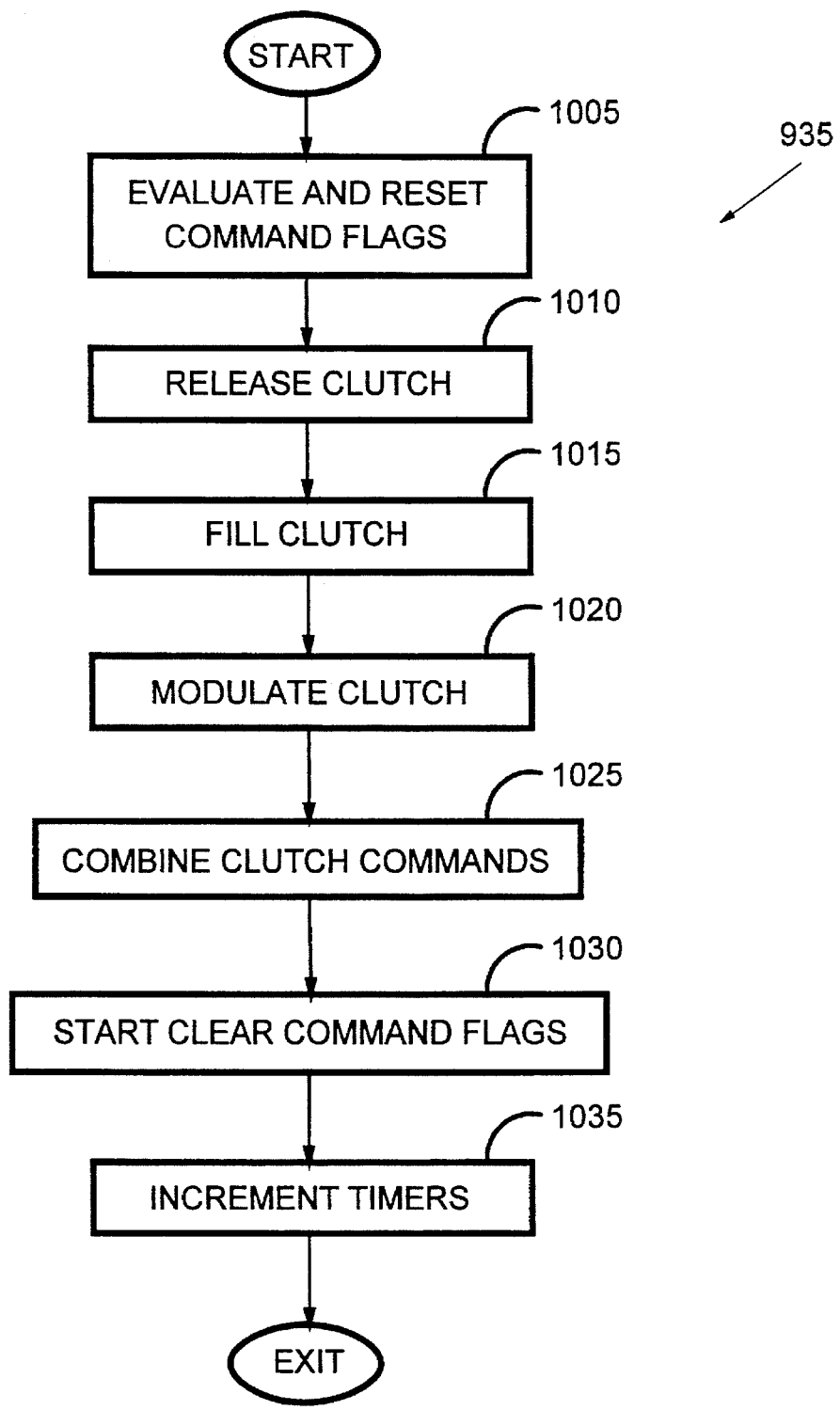
Fig_10_

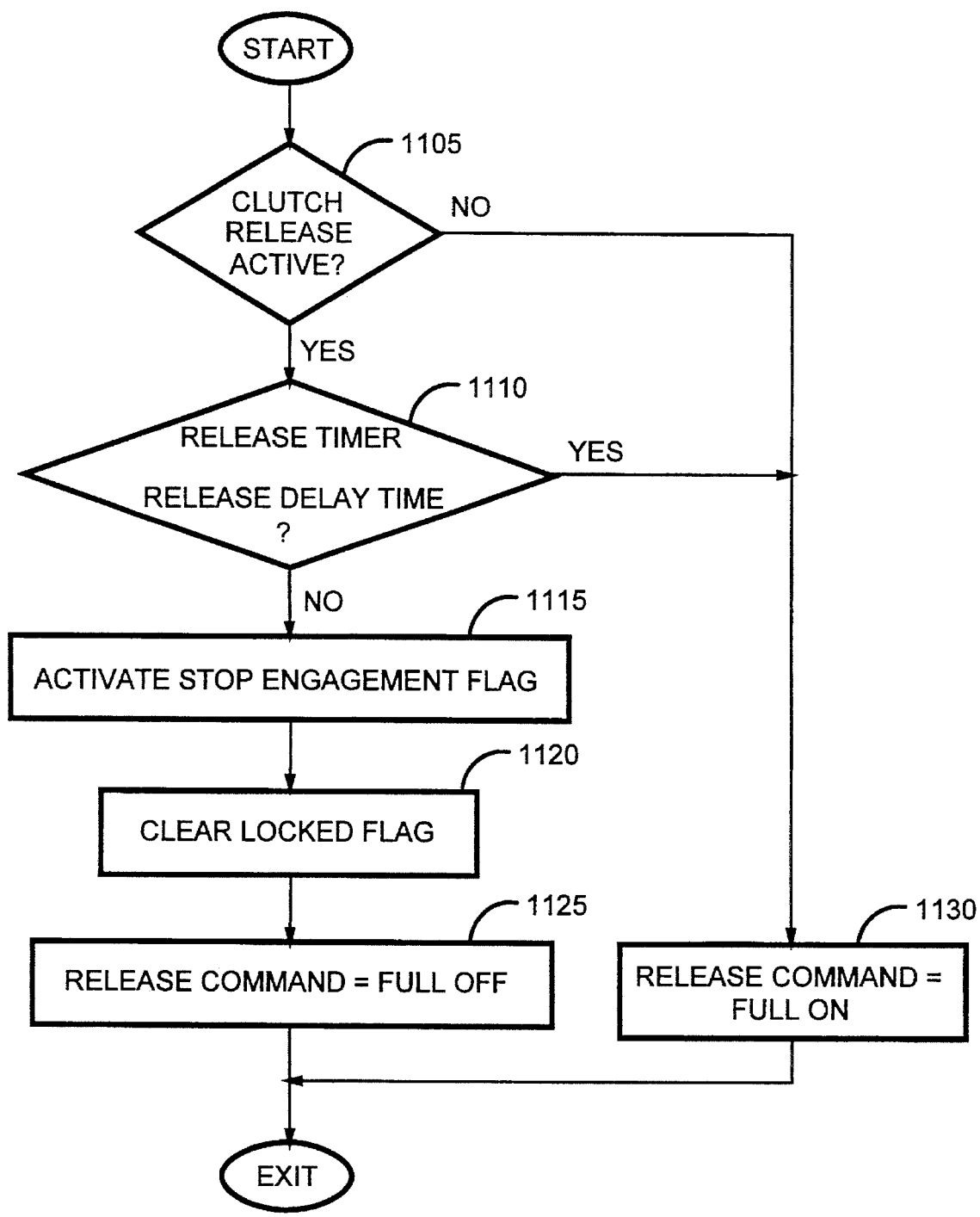
Fig_11_

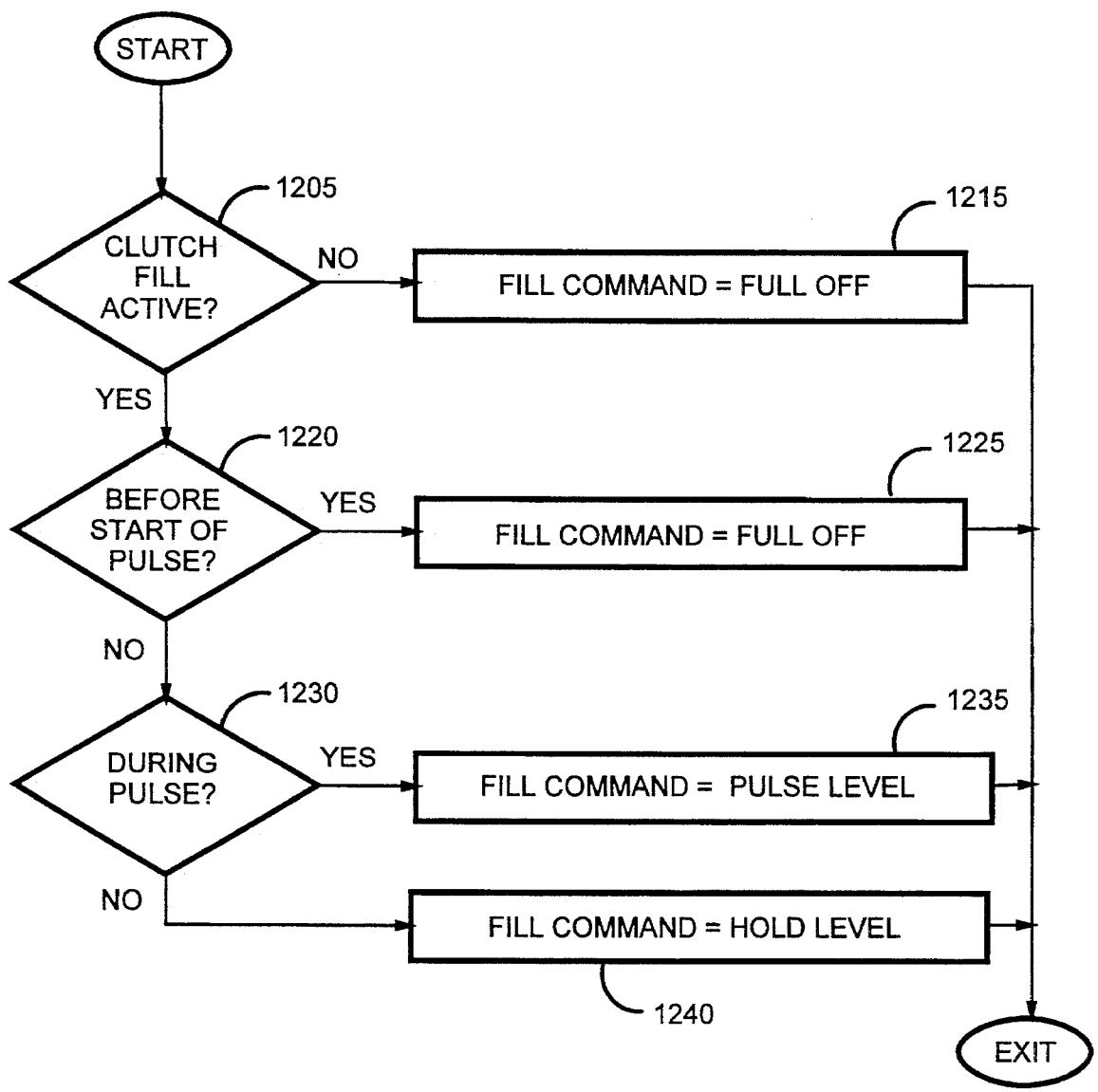
Fig_12_

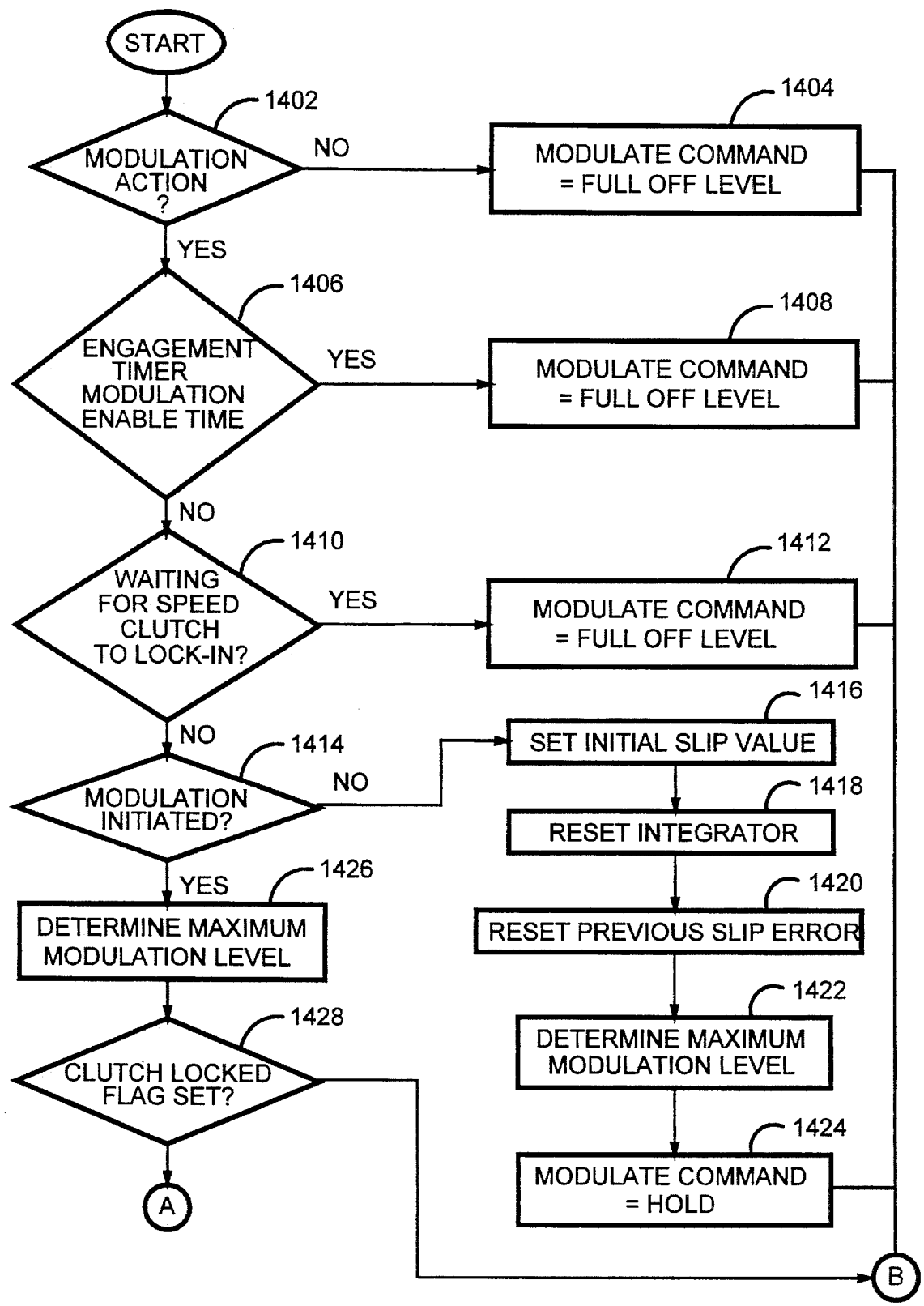
Fig_14A_

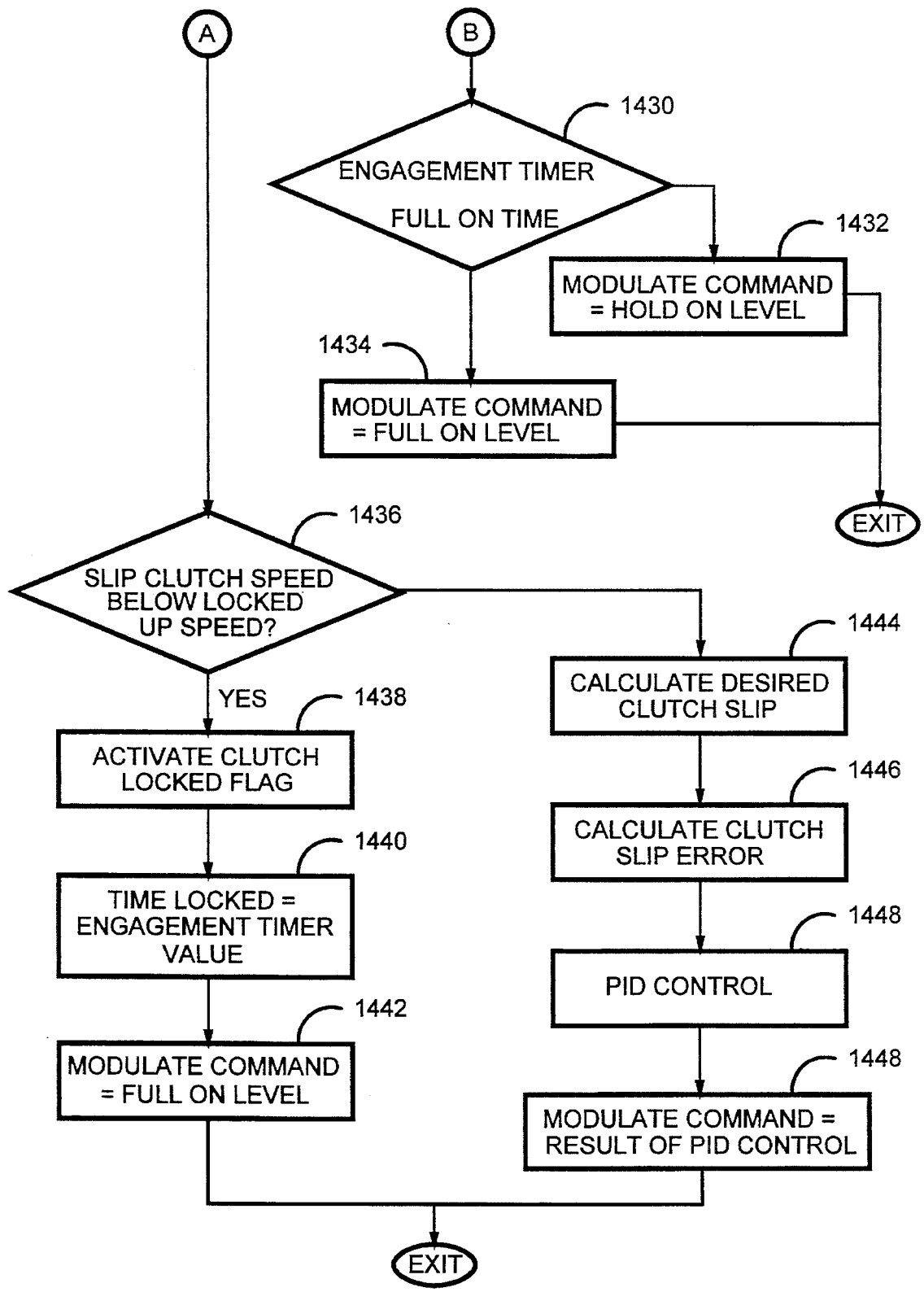
Fig_14B_

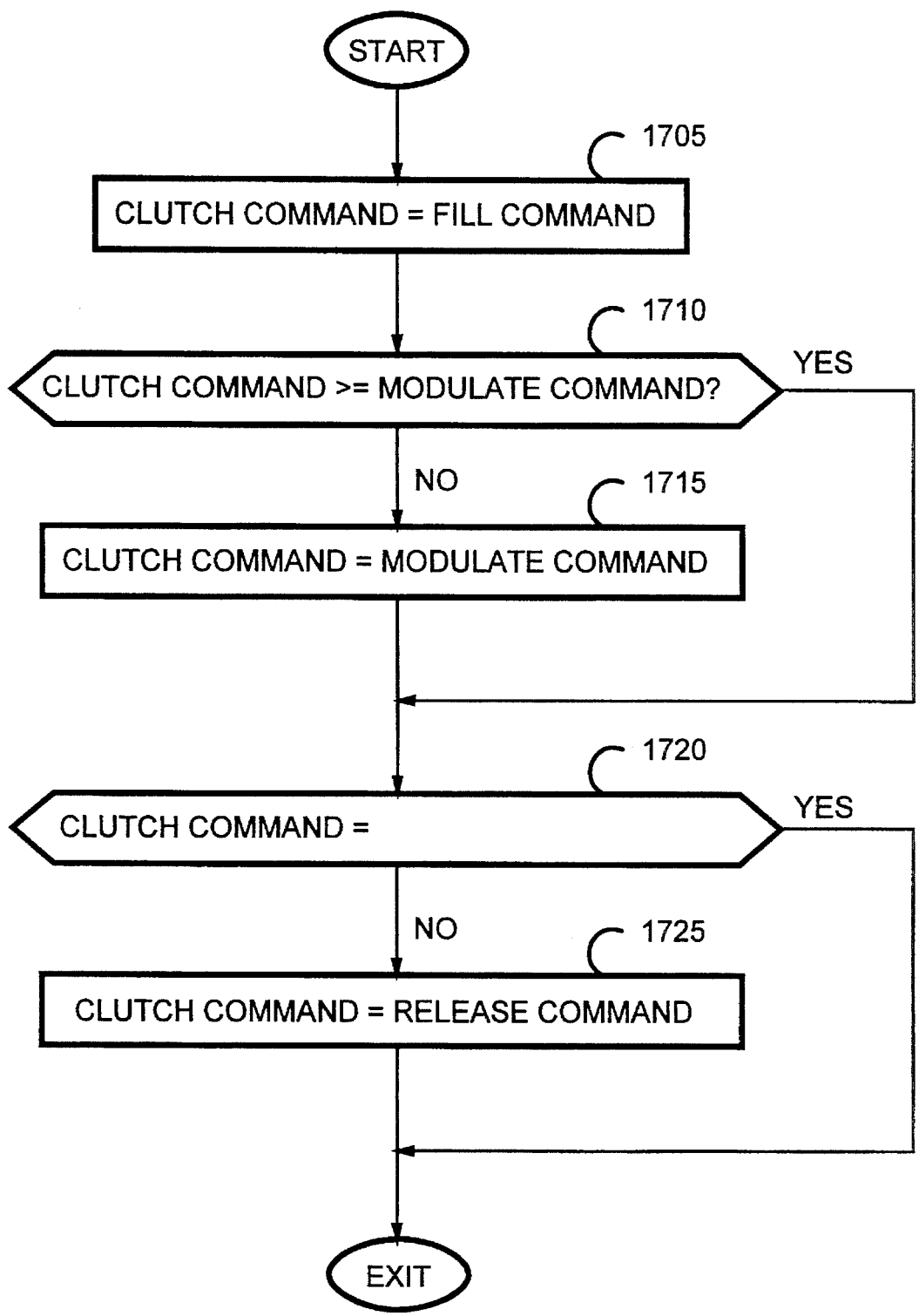
Fig-17-

5,467,854

METHOD OF CONTROLLING CLUTCH-TO-CLUTCH SHIFTS FOR A POWERSHIFT TRANSMISSION

TECHNICAL FIELD

This invention relates generally to a method of controlling a shift in a powershift transmission and, more particularly, to a method of electronically controlling a clutch-to-clutch shift of a powershift transmission.

BACKGROUND ART

Generally, a motor vehicle powershift transmission includes a number of gear elements coupling the input and output shafts, and a related number of clutches which are selectively engageable to activate gear elements for establishing a desired speed ratio between the input and output shafts. The clutch may be of the band or disk type.

For example, the input shaft may be connected to the engine through a fluid coupling, such as a torque converter, and the output shaft is connected directly to the vehicle drive. Shifting from one gear ratio to another involves releasing or disengaging the off-going clutches associated with the current gear ratio and applying or engaging the on-coming clutches associated with the desired gear ratio.

Shifts performed in the above manner are termed clutch-to-clutch shifts and require precise timing in order to achieve high quality shifting.

DISCLOSURE OF THE INVENTION

In one aspect of the present invention, an electronic shift control for a powershift transmission is disclosed. The transmission includes a plurality of speed and direction changing clutches. A plurality of pressure control valves are individually connected to the clutches. A hydraulic pump delivers pressurized hydraulic oil to predetermined pressure control valves to meter hydraulic fluid in response to receiving a clutch command signal. The method produces a shift from a first transmission ratio to a second transmission ratio through disengagement of an off-going clutch associated with the first transmission ratio and engagement of an on-coming clutch associated the second transmission ratio. The method includes filing an on-coming speed clutch, releasing an off-going direction clutch in response to the on-coming speed clutch being filled, and thereafter, gradually increasing the on-coming speed clutch pressure to engage the speed clutch. Finally, the on-coming direction clutch pressure is gradually increased to engage the direction clutch in response to the on-coming speed clutch being engaged.

BRIEF DESCRIPTION OF THE DRAWINGS

For a better understanding of the present invention, reference may be made to the accompanying drawings in which:

FIGS. 3,4,5 are timing charts illustrating clutch commands for various types of transmission shifts;

FIG. 6 shows timing charts illustrating various clutch commands associated with a combination shift;

FIGS. 7A–C are charts illustrating relationships between compensation values and transmission temperature and/or engine speed;

FIGS. 8–12, 14A,B and 17 are flowcharts illustrating software control of a transmission shift;

FIG. 13 is a timing chart illustrating the clutch command of a filling phase of a clutch;

FIG. 16 is a timing chart illustrating the desired clutch slip of a clutch in the modulation phase.

BEST MODE FOR CARRYING OUT THE INVENTION

Figure 1B:
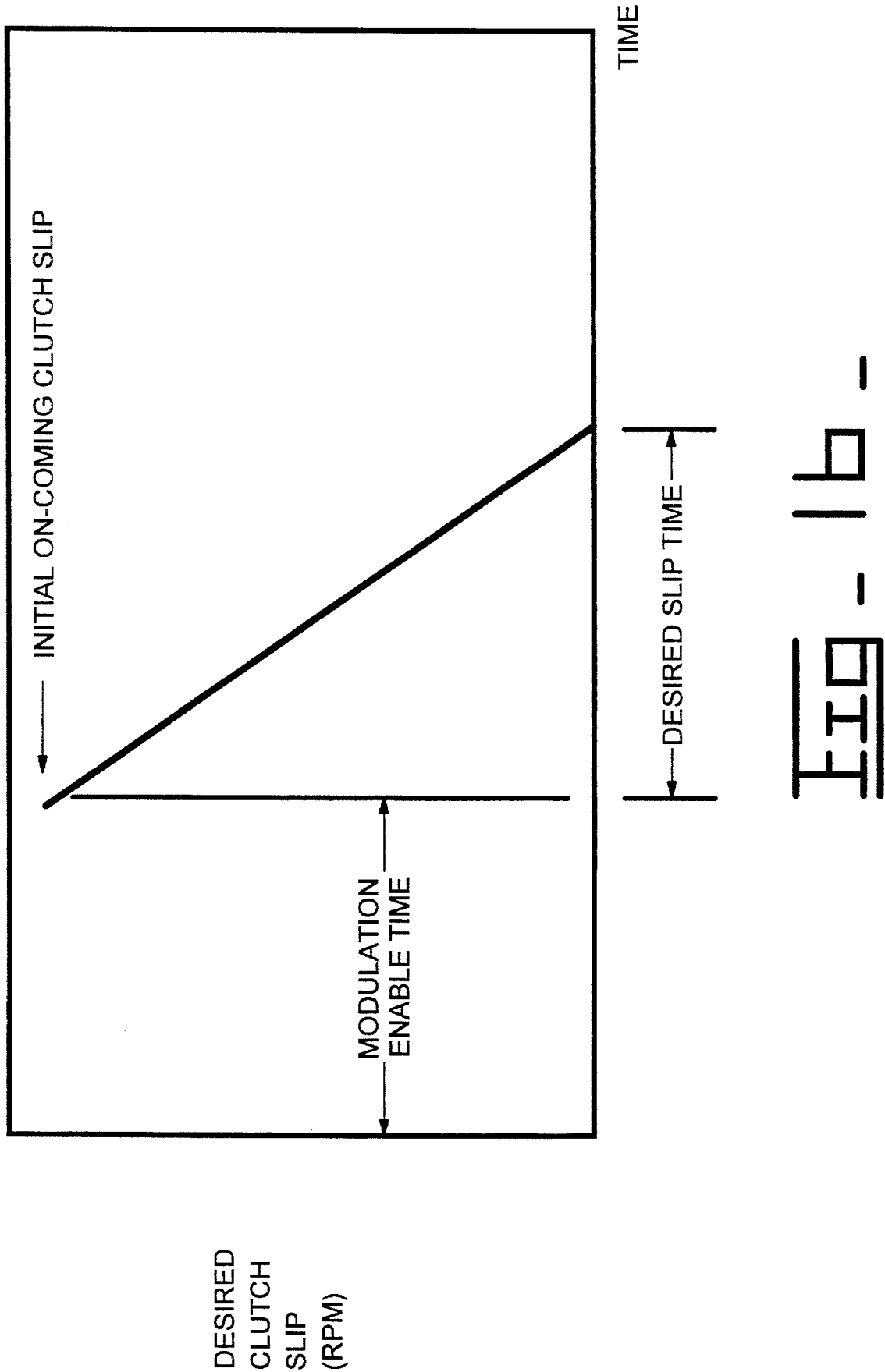
FIG. 1 is a block diagram of an electronic control system of a vehicle drive train including a transmission.

Referring now to the drawings, FIG. 1 illustrates a electronic control system of a power train 100 that includes an internal combustion engine 105, a fluidic torque converter 110, a multi-speed fluid operated power transmission 115, and a vehicle drive train 120. The engine 105 is connected to the torque converter 110 via shaft 125, the torque converter 110 is connected to the transmission 115 via shaft 130, and transmission 115 is connected to the vehicle drive 120 via shaft 135.

Figure 2B:
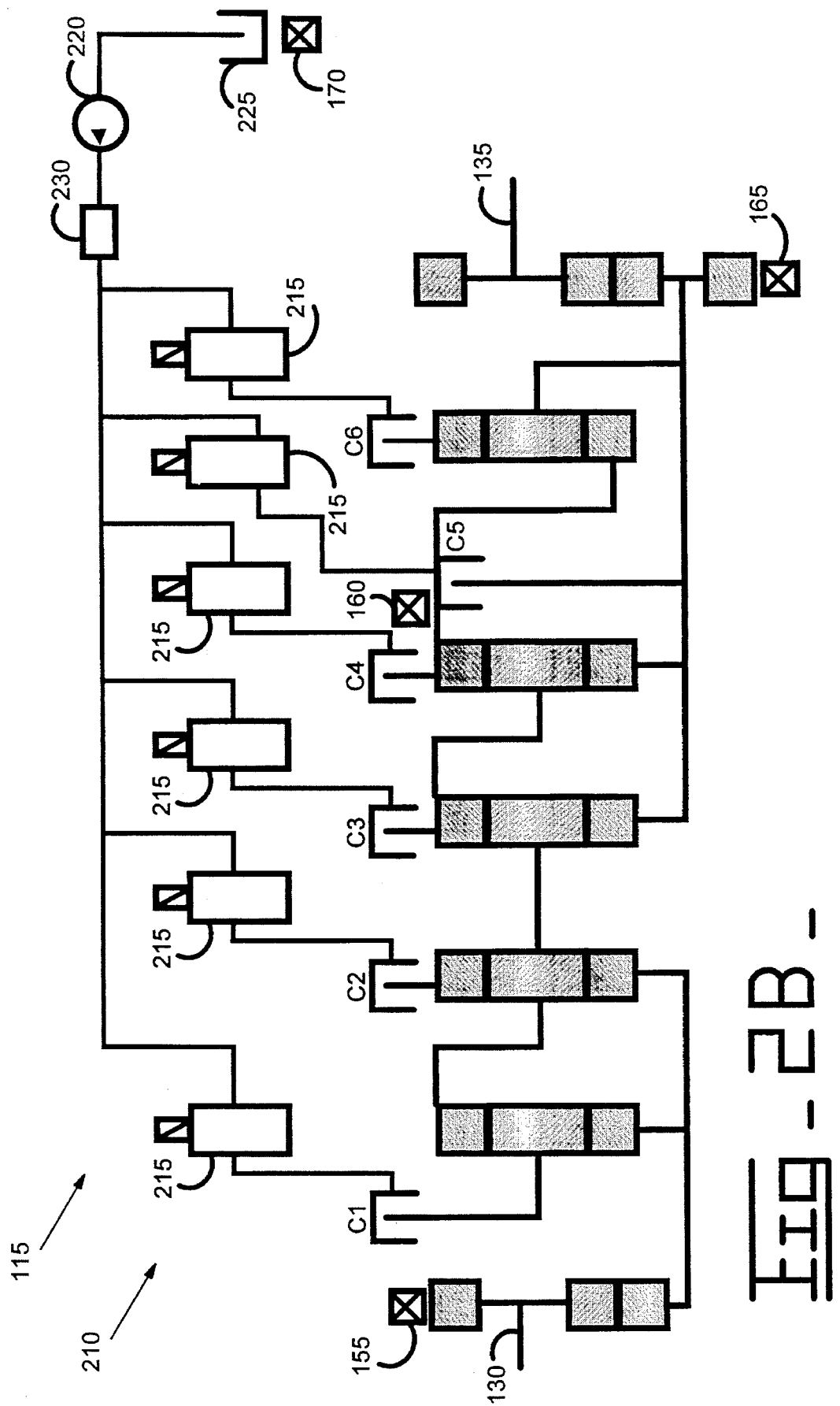
FIGS. 2A,B are block diagrams illustrating respective embodiments of a transmission configuration.

Referring now to FIGS. 2A,2B, a block diagram of two transmission gear sets are shown. For example, FIG. 2A represents a track-type tractor transmission gear set 205, and FIG. 2B represents a wheeled vehicle transmission gear set 210. The transmission of FIG. 2A includes five clutches, where C1 is a reverse direction clutch, C2 is a forward direction clutch and clutches C3–C5 are speed clutches. The transmission of FIG. 2B includes six clutches, where C1 is a reverse direction clutch, C2 is a forward direction clutch and clutches C3–C6 are speed clutches. Gear shifts are accomplished by selectively engaging and disengaging combinations of the clutches. The clutches are actuated by hydraulic pressure and upon engagement, require fill time before torque is transmitted between a driving and a driven friction element. That is, the fill time is the elapsed time that the clutch piston moves from the released to the engaged position. The clutches are selectively engaged and disengaged by solenoid operated proportional pressure control valves 215. The hydraulic circuit of the transmission includes a positive displacement pump 220 that supplies pressurized hydraulic fluid from the sump or reservoir 225 to the clutches through the control valves 215. Moreover, a relief valve 230 may be added to regulate the valve supply pressure.

Referring back to FIG. 1, the control portion of the power train will now be discussed. An operator initiates a desired shift via an operator shift handle 140, which produces a gear selection signal. An electronic control module 147 receives the gear selection signal and responsively controls the operation of the solenoid control valves 215. The electronic control module 147 may also receive various other input signals representative of vehicle system parameters. Such other inputs signals may include a neutralizing signal from a neutralizer pedal 145, an engine speed signal from an engine speed sensor 150, an transmission input speed signal, $T_I$, from a transmission input speed sensor 155, a transmission intermediate speed signal, $T_N$, from a transmission intermediate speed sensor 160, a transmission output speed signal, $T_O$, from a transmission output speed sensor 165, and a transmission oil temperature signal from a transmission oil temperature sensor 170. The sensors are conventional electrical transducers such as potentiometers, thermistors and/or magnetic speed pickups.

Internally, the electronic control module 147 comprises a number of conventional devices including a microprocessor with an internal clock and memory, an input/output device, and an array of proportional solenoid current drivers. One solenoid driver are dedicated to each solenoid control valve 215. The microprocessor delivers a command signal proportional to the desired solenoid current, and the current driver uses a Pulse Width Modulated voltage to produce the desired current. The solenoid control valves 215 are configured to maintain a flow of oil to the clutch sufficient to maintain a clutch pressure proportional to the solenoid current. Thus, the microprocessor can control the clutch pressure proportional to the command signal delivered to the solenoid driver circuit. Proportional solenoid current drivers are well known in the art, and need not be further discussed.

The microprocessor utilizes arithmetic units to control the transmission shifting in accordance with software programs. Typically, the programs are stored in read-only memory, random-access memory or the like. The programs are discussed in relation to various flowcharts.

The clutch commands that control the various types of shifts are shown with respect to FIGS. 3,4 and 5. Note that the direction clutch is used to absorb the majority of the torque transmitted by the shift. Thus, the direction clutch is the last clutch to be fully engaged in a shift. For example, in the case of a speed shift, the direction clutch will first be disengaged, then only after the on-coming speed clutch is fully engaged, will the direction clutch be re-engaged.

A speed shift is shown in relation to FIG. 3. The clutch command, which controls the clutch pressure, is shown with respect to time. First, the on-coming speed clutch enters a pulse and hold phase. As shown, the on-coming clutch command is pulsed at a high level for a predetermined time. The pulse phase quickly opens the solenoid control valve to begin filling the clutch, which strokes of the clutch piston. The clutch command is then decreased to a hold level to completely fill the clutch. The value of the hold level is high enough to insure completion of clutch fill, yet low enough to prevent excessive torque transmission when the clutch plates "touch-up." After the on-coming clutch is filled, the on-coming clutch pressure enters a modulation phase. The modulation phase utilizes either a closed-loop or open-loop control to gradually increase the clutch pressure to cause a desired decrease in clutch slip. Once the on-coming clutch locks-up or engages, the on-coming clutch pressure is increased to a maximum pressure level.

The off-going speed and direction clutch pressures are decreased to a low pressure level for a predetermined time period before the on-coming speed clutch is modulated. The predetermined time period minimizes the amount of time that there is a torque interruption during a shift.

Once the on-coming speed clutch is engaged, the direction clutch then enters a modulation phase. The modulation phase utilizes a closed-loop control to gradually increase the clutch pressure to cause a desired decrease in clutch slip. Once the direction clutch is engaged, then the clutch pressure is increased to a maximum pressure level to complete the shift.

Note that the end-of-fill of the on-coming clutches may be predetermined or sensed by various methods. For example, dedicated end-of-fill detection sensors, timing methods or other known end-of-fill detection methods may be employed to indicate the end-of-fill. Additionally, clutch lock-up may be indicated by monitoring clutch slip.

A direction shift is shown in relation to FIG. 4. Here, the speed clutch pressure remains unchanged while the direction clutch pressures are modified. First the on-coming direction clutch command is pulsed, then reduced to a hold level to fill the clutch. Then, the off-going direction clutch pressure is decreased to a low pressure level a predetermined time before the on-coming direction clutch enters the modulation phase. The modulation phase uses a closed-loop pressure control to result in a desired decrease in clutch slip. Once the on-coming clutch locks-up, then the clutch pressure is increased to a maximum pressure level to complete the shift.

A combination or direction and speed clutch shift is shown in relation to FIG. 5. The on-coming speed clutch command is first pulsed and held at a predetermined level to fill the clutch. After the on-coming speed clutch is filled, the clutch pressure is modulated until the clutch locks-up, then the clutch pressure is quickly increased to a maximum pressure level to fully engage the clutch. However, a predetermined time period prior to the on-coming speed clutch entering the modulation phase, the off-going speed and direction clutch pressures are decreased to release the clutches. Moreover, a predetermined time period after the on-coming speed clutch begins filling, the on-coming direction clutch command is pulsed then held to fill the clutch. The on-coming direction clutch pressure is then modulated after the on-coming speed clutch is engaged. Once the on-coming direction clutch locks-up, the clutch pressure is increased to a maximum level to fully engage the clutch to complete the shift.

The flowcharts illustrated in FIGS. 8–12, and 14 represent computer software logic for implementing the preferred embodiment of the present invention. The program depicted on the flowcharts is adapted to be utilized by any suitable microprocessor system.

The various decisions blocks shown in the flowcharts of FIGS. 8–12, and 14 may use two-dimensional look-up tables of a type well-known in the art. Hereafter the term table is used to reference a multi-dimensional look-up table that is stored in either RAM, ROM, or EEPROM of the microprocessor. The values are based from simulation and analysis of empirical data and are dependent upon the desired operating characteristics of the drive train.

FIG. 8 represents a transmission control subroutine which directs the sequential execution of various subroutines. The transmission control subroutine is called repeatedly at fixed time increments by the operating system of the electronic control module 147. Block 805 reads the various input signal values from the various sensors. Block 810 calculates clutch slipping of the various clutches. For example, a clutch slip is defined as the difference between the clutch input speed and clutch output speed.

Block 815 determines the shift scheduling based on the input from the shift handle and neutralizer pedal. For example, the output of block 815 is a variable that represents the gear that the transmission is shifting to. The shift control block 820 analyzes the various system input signals described above in reference to FIG. 1 and develops clutch command signals for application to the solenoid operated control valves at the next execution block 825, which outputs the required control signals to the proportional solenoid current drivers for the solenoid controlled valves.

The flowcharts of FIGS. 9–12, and 14 represent the subroutines of block 820 for making decisions as to the type of shift and determining the specific control of the on-coming and the off-going clutches. In the description of the subroutines, the functional explanation marked with numerals in angle brackets, <nnnn>, refers to blocks bearing that number.

With reference now to FIG. 9, the program control first determines whether a new gear has been selected <910>. If a new gear has been selected, then a "shift in progress" flag is set <915> and the start of shift calculations are performed <920>.

Here the program control computes the desired sequence of events and corresponding parameters to produce a high quality shift. For example, FIGS. 6A–D illustrates the clutch command and corresponding parameters associated with a combination shift that requires changing of both speed and direction clutches, such as a 1st speed forward to a 2nd speed reverse shift. FIG. 6 represents a clutch command for an on-coming speed clutch, a clutch command for an off-going speed clutch, a clutch command for an on-coming direction clutch, and a clutch command for an off-going direction clutch. The program control determines the shift parameters according to Table 1, shown below.

TABLE 1

|  | Speed Shift | Direction Shift | Combination Shift |
|---|---|---|---|
| Offgoing Speed Clutch | | | |
| Release Delay Time | OCSC Modulation Enable Time - Offgoing to Oncoming Margin - Release Decay Time table value for each clutch | Not Applicable | OCSC Modulation Enable Time - Offgoing to Oncoming Margin - Release Decay Time table value for each clutch |
| Oncoming Speed Clutch | | | |
| Pulse Delay Time | Zero | Not Applicable | Zero |
| Pulse Level | Table value for each clutch | Not Applicable | Table value for each clutch |
| Pulse Time | Table value for each clutch compensated by table function of transmission oil temperature | Not Applicable | Table value for each clutch compensated by table function of transmission oil temperature |
| Hold Level | Table value for each clutch compensated by table function of transmission oil temperature | Not Applicable | Table value for each clutch compensated by table function of transmission oil temperature |
| Hold Time | Table value for each clutch compensated by table function of engine speed | Not Applicable | Table value for each clutch compensated by table function of engine speed |
| Modulation Enable Time | Pulse Delay Time + Pulse Time + Hold Time | Not Applicable | Pulse Delay Time + Pulse Time + Hold Time |
| Desired Slip Time | Table value for each shift | Not Applicable | Table value for each shift |
| Offgoing Direction Clutch | | | |
| Release Delay Time | Not Applicable | OCDC Modulation Enable Time - Release Decay Time table value for each clutch - Offgoing to Oncoming Margin | Shortest of (OCSC Modulation Enable Time - Release Decay Time table value for each clutch - Offgoing to Oncoming Margin) or (OGSC Release Delay Time) |
| Oncoming Direction Clutch | | | |
| Release Delay Time | Shortest of (OCSC Modulation Enable Time - OCDC Release Decay Time - Offgoing to Oncoming Margin) or (OGSC Release Delay Time) | Not Applicable | Not Applicable |
| Pulse Delay Time | OCDC Release Delay Time | Zero | (Modulation Enable Time - Pulse Time - Hold Time) but not less than zero |
| Pulse Level | Not Applicable | Table value for each clutch | Table value for each clutch |
| Pulse Time | Zero | Table value for each clutch compensated by table function of transmission oil temperature | Table value for each clutch compensated by table function of transmission oil temperature |
| Hold Level | Table value for each clutch | Table value for each clutch compensated by table function of transmission oil temperature | Table value for each clutch compensated by table function of transmission oil temperature |
| Hold Time | Table value for each clutch | Table value for each clutch compensated by table function of engine speed | Table value for each clutch compensated by table function of engine speed |
| Modulation | OCSC Modulation Enable | Pulse Delay Time + Pulse | OCSC Modulation Enable Time + |

TABLE 1-continued

|  | Speed Shift | Direction Shift | Combination Shift |
| --- | --- | --- | --- |
| Enable Time | Time + OCSC Desired Slip Time | Time + Hold Time | OCSC Desired Slip Time |
| Desired Slip Time | Table value for each shift | Table value for each shift | Table value for each shift |

The shift parameters are unique for each specific gear. The actual values are represented by multiple tables. Thus, different values are chosen for each type of shift, e.g., speed shifts (1–2, 2–1, 4–3, etc.); direction shifts (1F–1R, 2R–2F, etc.); and combination shifts (1F–2R, 2R–1F, etc.). It will be readily apparent to those skilled in the art that the table values are dependent upon the desired performance of the drive train and the particular type solenoid control valves utilized. Although the table values are not shown herein, they may be readily determined by those well skilled in the art. Note that in the following discussion, the acronym "OGSC" represents a predetermined off-going speed clutch; "OCSC" represents a predetermined on-coming speed clutch; "OGDC" represents a predetermined off-going direction clutch; and "OCDC" represents a predetermined on-coming direction clutch.

First, the program control determines the off-going and on-coming clutch assignments for the desired shift in response to the current gear and the desired gear. The clutch assignments may be found in a table. Once the clutch assignments are determined, the control determines the shift parameters. The shift parameters are computed according to the type of shift, e.g., speed, direction, or combination. The calculation of the shift parameters are now discussed.

OFF-GOING SPEED CLUTCH PARAMETERS

The OGSC Release Delay Time is calculated to release the off-going speed clutch at a predetermined time period (the Off-going to On-coming Margin) prior to the OCSC Modulation Enable Time. The Off-going to On-coming Margin provides for a minimum torque interruption to prevent clutch "tie-up." Additionally, a predetermined Release Decay Time is provided for each clutch control valve to continue transmitting torque during the Release Decay Time after the clutch control valve is commanded off.

ON-COMING SPEED CLUTCH PARAMETERS

The OCSC Pulse Delay Time is calculated with a value of zero to fill the on-coming speed clutch immediately. The OCSC Pulse Level is selected according to a table of values for each clutch. Moreover, the OCSC Pulse Time, Hold Level, and Hold Time are selected by tables of values for each clutch; however, the values may be later adjusted according to a compensation factor indicative of transmission oil temperature or engine speed. The compensation factors are determined experimentally and are contained in a table representing a plurality of compensation factor values corresponding to a plurality of engine speed and transmission oil temperature values. The purpose of the compensation factors is to adjust clutch fill control and account for changes in hydraulic fluid flow available to fill the clutch as engine speed and transmission oil temperature varies. The OCSC Pulse Time, Hold Level, and Hold time are each multiplied by its respective compensation factor to produce the final value for the shift. For example, FIGS. 7A–C represent a graph illustrating the relationship between the compensation factors, i.e., hold time and engine speed; hold level and temperature; and pulse time and temperature.

The OCSC Modulation Enable Time value is determined by summing the OCSC Pulse Delay Time, Pulse Time, and Hold Time values. The OCSC Modulation Enable Time value provides for the on-coming speed clutch to be modulated as soon as the clutch is expected to be filled.

The OCSC Desired Slip Time is selected by a table of values for each shift. The desired slip time value provides a desired shift smoothness while also preventing clutch overheating and excessive clutch wear.

OFF-GOING DIRECTION CLUTCH PARAMETERS

The OGDC Release Delay Time is determined relative to the OCSC Modulation Enable Time. Typically, the OGDC Release Delay Time value is set equal to the OGSC Release Delay Time.

ON-COMING DIRECTION CLUTCH PARAMETERS

The OCDC Pulse Delay Time provides for the filling of the on-coming direction clutch to be completed prior to on-coming direction clutch being modulated.

The OCDC Pulse Level is selected according to a table of values for each clutch. The OCDC Pulse Time, Hold Level, and Hold Time values are selected in the same manner as the on-coming speed clutch described above.

The OCDC Modulation Enable Time is determined by summing the OCSC Modulation Enable Time with the OCSC Desired Slip Time. The OCDC Modulation Enable Time provides for the on-coming direction clutch to be in the modulation phase as soon as the on-coming speed clutch locks-up.

The OCDC Desired Slip Time is selected according to a table of values for each shift. The OCDC Desired Slip Time value also provides for a desired shift smoothness while preventing clutch overheating and excessive clutch wear.

Finally, once the start of shift calculations are completed various command flags are used to initiate the shift action.

Adverting back to block 920 of FIG. 9, once the start of shift calculations are performed, then the Clutch Control subroutine is called <935>. The Clutch Control subroutine manages the clutch engagement and clutch release, and is later discussed with reference to FIG. 10. Thereafter, the control determines whether a shift is in progress <940>. If a shift is in progress, the control determines whether the selected gear is "locked-in", i.e., the shift is complete <945>. If the selected gear is locked-in, then the "shift in progress" flag is cleared <950> and the current gear is set to the value of the new or desired gear <955>.

Reference is now made to FIG. 10, which describes the Clutch Control subroutine. At block 1005, various command flags are set to appropriate values. The flags are then communicated to the various subroutines. Clutch engagement is initiated through a Start Engagement Flag, and clutch release is initiated through a Start Release Flag. A Cancel Release Flag cancels the release of a clutch at the beginning of engagement, while a Stop Engagement Flag is used to deactivate the other subroutines that control clutch engagement.

First, the program control determines the current state of the command flags, and sets the flags to the appropriate values depending on the stage of the shift. Note, the command flags will be discussed in relation to the following flowcharts. The stage of the shift is monitored by an Engagement Timer and Release Timer.

Once the command flags are set, the control calls the Release Clutch subroutine <1010>. The Release Clutch subroutine manages the release of an off-going clutch by determining the time at which the off-going clutch should be released. The Release Clutch Subroutine will be discussed in greater detail with reference to FIG. 11. Thereafter, the control calls the Fill Clutch Subroutine <1015>, which manages the fill phase of clutch engagement. The Fill Clutch routine will be discussed later with reference to FIG. 12. Thereafter, the Modulate Clutch subroutine is called <1020>. The Modulate Clutch subroutine determines the level of hydraulic pressure to be applied to the clutch to result in a "smooth" engagement. For example, the Modulate Clutch subroutine manages the on-coming clutch pressure with a closed loop control, wherein the pressure is adjusted to maintain the on-coming clutch slip close to a predetermined set of values. The Modulate Clutch subroutine will be discussed later with reference to FIGS. 14A,B. The Release, Fill and Modulate Clutch Commands originating from the Release Fill and Modulate Clutch subroutines are then compared <1025>, which is discussed in greater detail with respect to FIG. 17. Finally, all start command flags are cleared <1030>, the Release and Engage Timers are incremented <1035>, and the Clutch Command is returned.

Figure 11:
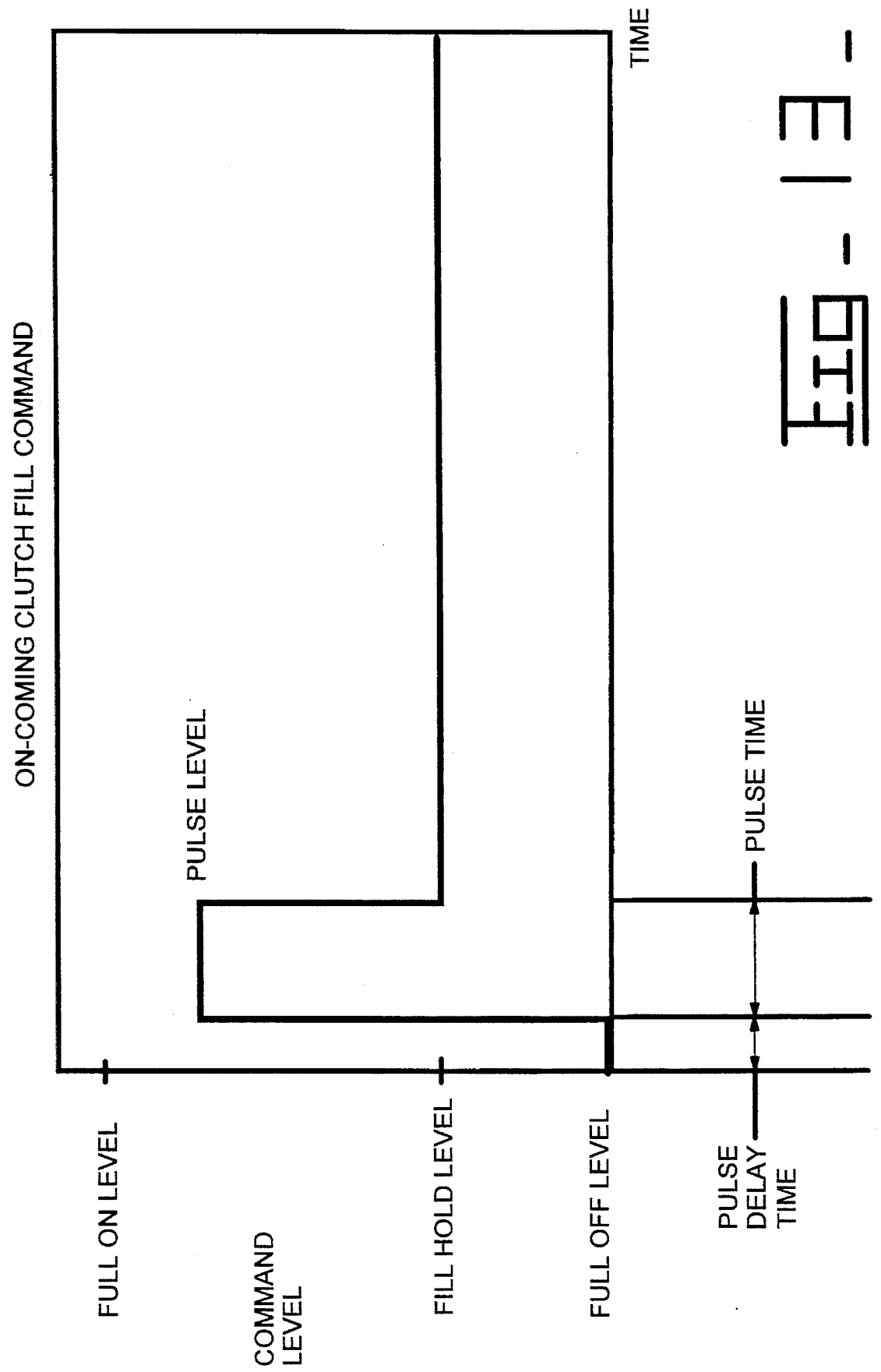

The Release Clutch subroutine controls the release of an off-going clutch and is discussed with reference to FIG. 11. The control first determines whether the Clutch Release Function is active <1105>. An active Clutch Release Function represents that the off-going clutch is to be released. If the Clutch Release Function is not active, then a Release Command Flag is set to a Full On Level <1130>.

However, if the Clutch Release Function is active, then the control determines if it is prior to the time at which the clutch is scheduled to release, i.e., the control determines whether the Release Timer value is less than the Release Delay Time <1110>. If so, then the Release Command Flag is set to a Full On Level <1130>. Otherwise, the control has determined that it is time to release the clutch, and a Stop Engagement Command Flag is activated <1150> and the Locked Command Flag is cleared <1120>, which indicates that the clutch is no longer locked-in. Accordingly, the Release Command is set to a Full Off Level <1125>.

Reference is now made to FIG. 12 to discuss the Fill Clutch subroutine. As stated earlier, the Fill Clutch subroutine manages the fill phase of an on-coming clutch. This routine returns a Fill command Level that is shown with reference to FIG. 13. Advantageously, the on-coming clutch is filled as quickly as possible by pulsing the clutch command to a Pulse Level to quickly open the electrohydraulic control valve to achieve the maximum fluid flow to the clutch. The clutch command then falls to a Hold Level, which is a level corresponding to just enough clutch pressure to overcome the clutch piston return springs. This eases the clutch pack together at the end of fill, and holds the clutch pack together with just enough pressure to keep the clutch pack from separating.

Referring now to the flowchart of FIG. 12, the program control first determines whether the Clutch Fill Function is active <1225>. If the Clutch Fill Function is inactive, then a Fill Command Flag is set to a Full Off Level <1230>. If the Clutch Fill Function is active and it is before the time that the pulse is scheduled to begin <1235>, then the Fill Command Flag is set to a Full Off Level <1240>. However, if the Clutch Fill Function is active and it is during the time scheduled for the pulse <1245>, then the Fill Command Flag is set to a Pulse Level <1250>. Finally, if the Clutch Fill Function is active and it is after the time scheduled for the pulse, then the Fill Command Flag is set to a Hold Level <1255>.

Figure 15:
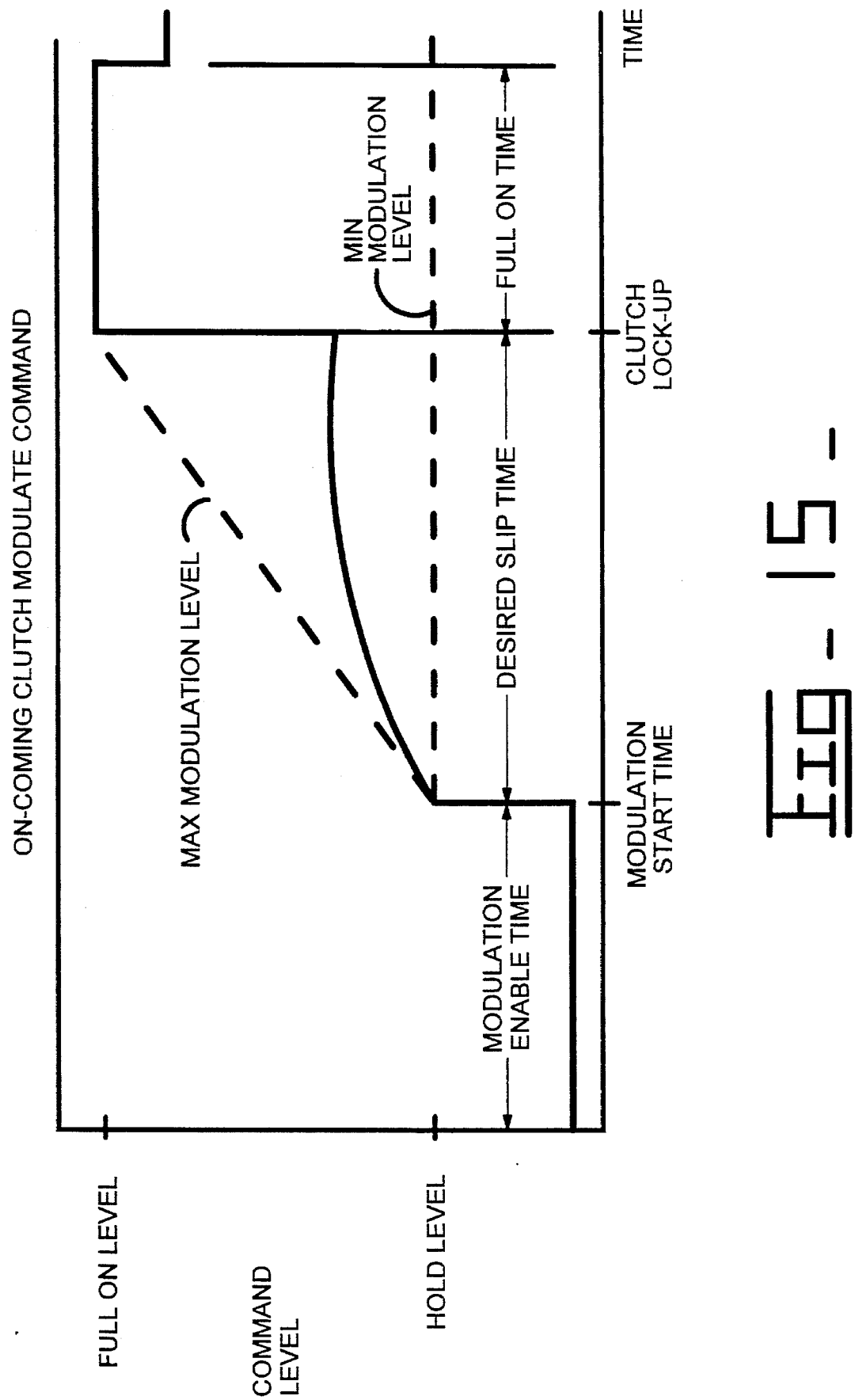
FIG. 15 is a timing chart illustrating the clutch command of a modulation phase of a clutch.

Referring now to the flowchart of FIGS. 14A,B, the Modulate Clutch subroutine is now discussed. The Modulate Clutch subroutine increases the clutch pressure from a Hold Level to a Full On Level to engage or lock-up the on-coming clutch. The corresponding clutch command is shown on FIG. 15. The clutch command level is determined by a closed loop PID control that monitors the difference between the actual clutch slip and the desired clutch slip during engagement. For example, as shown on FIG. 16, the desired clutch slip has a constant slope, but the desired clutch slip may have any desired shape. Once a clutch locks-up, the Modulate Clutch subroutine initiates a clutch command having the Full On Level to make certain that the clutch does not break loose under high transient torque loads. As shown on FIG. 15, after a predetermined time period, the clutch command may fall to a Hold On level to reduce the pressure on the engaged clutch to minimize the leakage of the clutch and valve.

Referring back to FIG. 14A, the program control begins by determining whether the Clutch Modulate Function is active <1402>, which represents that the on-coming clutch is to be engaged. If not, the Modulate Command Flag is set to a Full Off Level <1404>.

If the Modulate Clutch Function is active, but it is prior to the time that the clutch is scheduled to be modulated, i.e., the Engagement Timer value is less than the Modulation Enable Time value <1406>, then the Modulate Command Flag is set to a Full Off Level <1408>. Otherwise, the control determines if another clutch is to be engaged before the current clutch is to begin modulation <1410>. Note that block 1410 is primarily concerned with a direction clutch. For example, during a speed shift, the direction clutch is released then reengaged as part of the shift. Thus, if the current clutch (that is being controlled) is a direction clutch, then the on-coming speed clutch must be locked-in before the direction clutch is to be modulated. Accordingly, if the control is waiting for another clutch to lock-in, i.e., a speed clutch, then the Modulate Command Flag is set to a Full Off Level <1412>.

Otherwise the control determines whether modulation has been initiated, i.e., whether the Engagement Timer value equals the Modulation Enable Time value or whether the speed clutch has locked-in <1414>. If the control has not yet initiated modulation, then the control initializes the modulation variables: an initial clutch slip value is set to the current clutch slip <1416>, a PID integrator is reset <1418>, the previous slip error is set to zero <1420>, and the maximum modulation rate is set <1422>. Finally, the Modulate Command Flag is set to a Hold Level <1424>.

If it is after the time to start modulation, the control then determines the Maximum Modulation Level <1426>, and determine whether the current clutch was previously engaged or locked-in <1428>. If the clutch was not previously locked-in, then the control determines whether the Engagement Timer value is greater than the summation of the time elapsed from the time that the clutch was locked-in until the time that the Full On Command was produced <1430>. If so, then the Modulate Command Flag is set to a Hold On Level <1432>, otherwise the Modulate Command Flag is set to a Full On Level <1434>.

However, if the clutch was previously not locked-in at block 1428, then the clutch slip is compared to a predetermined clutch slip to determine if the clutch has just locked-in <1436>. If the control determines that the clutch has just locked-in, then the Clutch Locked Command Flag is activated <1438>, the Time Locked Command Flag is set to the Engagement Timer value <1440>, and the Modulate Command Flag is set to a Full On Level <1442>.

However, if the clutch was not determined to be just locked-in at decision block 1436, then the control initiates the clutch modulation phase. First, the control determines the Desired Clutch Slip <1444>, and the Clutch Slip Error <1446> (by calculating the difference between the Actual Clutch Slip and the Desired Clutch Slip). The control then determines the Modulate Command Level in response to the Clutch Slip Error using PID control <1448>. For example, at block 1448 the proportional, integral, and derivative terms of the PID control are determined and limited by the Minimum and Maximum Modulation Level. Finally, the Modulate Command Flag is set to the result of the PID control <1450>.

Reference is now made to FIG. 17 to discuss the combination of the release, fill and modulate commands. For example, the program control of FIG. 17 determines the priority of the three commands. The control first sets the Clutch Command to the Fill Command value <1705>, then compares the Clutch Command to the Modulate Command <1710>. If the Clutch Command is less than the Modulate Command, then the clutch Command is set to the Modulate command value <1715>. Otherwise, the Clutch Command is compared to the Release Command <1720>. If the Clutch Command is greater than the Release Command, then the Clutch Command is set to the Release Command value <1725>.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

The present invention is advantageously applicable to controlling a clutch-to-clutch shift of a powershift transmission of a construction machine such as a wheel loader, bulldozer, or the like. One such shift may be a speed shift that changes from one speed ratio to another speed ratio. A speed ratio is defined as the transmission input speed or torque converter speed divided by the output speed. Thus, a low gear range has a high speed ratio and a higher gear range has a lower speed ratio. To perform an upshift, a shift is made from a high speed ratio to a low speed ratio. In the type of transmission involved in this invention, the upshift is accomplished by disengaging a clutch associated with the higher speed ratio and engaging a clutch associated with the lower speed ratio to thereby reconfigure the gear set to operate at the lower speed ratio. With respect to a speed shift, such as an upshift, the direction clutch is used to absorb the torque created by the shift. Thus, during an upshift, the direction clutch is disengaged, then re-engaged after the on-coming speed clutch is engaged. In this manner the direction clutch absorbs the torque created during the shift.

The present invention is adapted to control the timing of the clutch-to-clutch shifts to achieve a high quality shifting. For example, during the clutch modulation, the electronic control module uses a closed loop control algorithm to control the clutch slip of the engaging clutches to provide for consistent clutch engagement irrespective to operating conditions or load on the vehicle. This results in crisp clutch engagements under any load conditions to result in increased driveline component life and reduces operator fatigue.

Other aspects, objects and advantages of the present invention can be obtained from a study of the drawings, the disclosure and the appended claims.

We claim:

1. A method of controlling a powershift transmission, the transmission comprising:

a plurality of speed changing clutches;

a plurality of direction changing clutches;

a plurality of pressure control valves individually connected to the clutches;

a hydraulic pump adapted to deliver pressurized hydraulic oil to the plurality of pressure control valves, predetermined ones of the pressure control valves metering hydraulic fluid to the clutches in response to receiving a clutch command signal, the method producing a shift from a first transmission ratio to a second transmission ratio through disengagement of an off-going clutch associated with the first transmission ratio and engagement of an on-coming clutch associated the second transmission ratio, in accordance to the following steps:

commanding a pressure control valve associated with an on-coming speed clutch to fill the clutch;

commanding a pressure control valve associated with an off-going direction clutch to reduce the clutch pressure to cause the direction clutch to release in response to the on-coming speed clutch being filled;

thereafter, commanding the on-coming speed clutch pressure control valve to gradually increase the clutch pressure to engage the speed clutch; and commanding a pressure control valve associated with an on-coming direction clutch to gradually increase the direction clutch pressure to engage the direction clutch in response to the on-coming speed clutch being engaged.

2. A method, as set forth in claim 1, including the step of commanding a pressure control valve associated with an off-going speed clutch to decrease the clutch pressure in response to the on-coming speed clutch being filled.

3. A method, as set forth in claim 2, wherein the step of filling an on-coming clutch includes the steps of:

pulsing the on-coming clutch pressure control valve for a predetermined time period; and thereafter commanding the on-coming clutch pressure control valve to maintain the clutch pressure at a predetermined pressure level.

4. A method, as set forth in claim 3, wherein the step of gradually increasing the on-coming clutch pressure includes the steps of:

measuring the slip speed of the on-coming clutch;

comparing the measured slip speed to a desired slip speed; and gradually increasing the pressure on the on-coming clutch to control the slip speed towards zero slip.

5. A method, as set forth in claim 4, including the step of commanding the on-coming pressure control valve to increase the clutch pressure to a maximum pressure level to fully engage the on-coming clutch in response to the slip speed being substantially zero.

6. A method of controlling a powershift transmission, the transmission comprising:

a plurality of speed changing clutches;

a plurality of direction changing clutches;

a plurality of pressure control valves individually connected to the clutches;

a hydraulic pump adapted to deliver pressurized hydraulic oil to the plurality of pressure control valves, predetermined ones of the pressure control valves metering hydraulic fluid to the clutches in response to receiving a clutch command signal, the method producing a shift from a first transmission ratio to a second transmission ratio through disengagement of an off-going clutch associated with the first transmission ratio and engagement of an on-coming clutch associated the second transmission ratio, in accordance to the following steps:

commanding a pressure control valve associated with an on-coming speed clutch to fill the speed clutch; thereafter commanding a pressure control valve associated with an on-coming direction clutch to fill the direction clutch;

commanding a pressure control valve associated with an off-going speed clutch to reduce the clutch pressure to cause the off-going speed clutch to release in response to the on-coming speed clutch being filled;

commanding a pressure control valve associated with an off-going direction clutch to reduce the off-going direction clutch pressure to cause the off-going direction clutch to release in response to the on-coming speed clutch being filled; thereafter commanding the on-coming speed clutch pressure control valve to gradually increase the speed clutch pressure to engage the speed clutch; and commanding a pressure control valve associated with an on-coming direction clutch to gradually increase the on-coming direction clutch pressure to engage the direction clutch in response to the on-coming speed clutch being engaged.

7. A method, as set forth in claim 6, including the step of commanding a pressure control valve associated with an off-going speed clutch to decrease the clutch pressure in response to the on-coming clutch being filled.

8. A method, as set forth in claim 7, wherein the step of filling an on-coming clutch includes the steps of:

pulsing the on-coming clutch pressure control valve for a predetermined time period; and thereafter commanding the on-coming clutch pressure control valve to maintain the clutch pressure at a predetermined pressure level.

9. A method, as set forth in claim 8, wherein the step of gradually increasing the on-coming clutch pressure includes the steps of:

measuring the slip speed of the on-coming clutch;

comparing the slip speed to a desired slip speed; and gradually increasing the pressure on the on-coming clutch to control the slip speed towards zero slip.

10. A method, as set forth in claim 9, including the step of commanding the on-coming pressure control valve to increase the clutch pressure to a maximum pressure level to fully engage the on-coming clutch in response to the slip speed being substantially zero.

11. A method, as set forth in claim 10, wherein the transmission is drivingly connected to an engine, the method including the steps of:

determining the speed of the engine;

determining the temperature of the transmission; and commanding the pressure control valves in response to the engine speed and transmission temperature.

* * * * *